(12) United States Patent
Ogawa

(10) Patent No.: US 12,111,251 B2
(45) Date of Patent: Oct. 8, 2024

(54) INFORMATION PROCESSING APPARATUS, INFORMATION PROCESSING METHOD, PROGRAM, AND SENSING SYSTEM

(71) Applicant: SONY GROUP CORPORATION, Tokyo (JP)

(72) Inventor: Tetsu Ogawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 357 days.

(21) Appl. No.: 17/597,079

(22) PCT Filed: Jun. 25, 2020

(86) PCT No.: PCT/JP2020/025083
§ 371 (c)(1),
(2) Date: Dec. 23, 2021

(87) PCT Pub. No.: WO2021/002280
PCT Pub. Date: Jan. 7, 2021

(65) Prior Publication Data
US 2022/0299433 A1 Sep. 22, 2022

(30) Foreign Application Priority Data
Jul. 3, 2019 (JP) ................................ 2019-124764

(51) Int. Cl.
*G01N 21/35* (2014.01)
*G01N 21/84* (2006.01)
(Continued)

(52) U.S. Cl.
CPC ............ *G01N 21/35* (2013.01); *G01N 21/84* (2013.01); *G01S 17/08* (2013.01); *G06T 7/0012* (2013.01);
(Continued)

(58) Field of Classification Search
CPC .......... B64C 39/02; B64G 1/66; G01N 21/17; G01N 21/35; G01N 21/84;
(Continued)

(56) References Cited

U.S. PATENT DOCUMENTS

2017/0374323 A1 12/2017 Gornik
2018/0306905 A1* 10/2018 Kapusta ................ G01S 7/4808
2019/0037136 A1* 1/2019 Downing ............. H04N 23/743

FOREIGN PATENT DOCUMENTS

JP 2007018387 A 1/2007
JP 2012088876 A 5/2012
(Continued)

OTHER PUBLICATIONS

International Search Report and Written Opinion of PCT Application No. PCT/JP2020/025083, issued on Oct. 8, 2020, 13 pages of ISRWO.
(Continued)

*Primary Examiner* — Mark R Gaworecki
(74) *Attorney, Agent, or Firm* — CHIP LAW GROUP

(57) ABSTRACT

There is provided an information processing apparatus including a macro measurement analysis calculation section configured to calculate detection data from a macro measurement section adapted to perform sensing at a first spatial resolution for a first measurement range for a measurement target, a micro measurement analysis calculation section configured to calculate detection data from a micro measurement section adapted to perform sensing at a second spatial resolution for a second measurement range, the second spatial resolution being higher than the first spatial resolution, the second measurement range being included in the first measurement range for the measurement target, and an inverse model calculation section configured to acquire a model parameter used for an inverse model calculation using a calculation result from the macro measurement analysis
(Continued)

calculation section, on a basis of the detection data from the micro measurement section determined by the micro measurement analysis calculation section.

16 Claims, 18 Drawing Sheets

(51) Int. Cl.
| | |
|---|---|
| *G01S 17/08* | (2006.01) |
| *G06T 7/00* | (2017.01) |
| *B64C 39/02* | (2023.01) |
| *B64G 1/66* | (2006.01) |
| *G01N 21/17* | (2006.01) |
| *G01S 17/89* | (2020.01) |
| *G06T 5/50* | (2006.01) |

(52) U.S. Cl.
CPC ............... *B64C 39/02* (2013.01); *B64G 1/66* (2013.01); *G01N 21/17* (2013.01); *G01N 2021/1793* (2013.01); *G01N 2021/1797* (2013.01); *G01N 2021/3595* (2013.01); *G01N 2021/8466* (2013.01); *G01S 17/89* (2013.01); *G06T 5/50* (2013.01); *G06T 2207/10032* (2013.01); *G06T 2207/30188* (2013.01)

(58) Field of Classification Search
CPC ... G01N 2021/1793; G01N 2021/1797; G01N 2021/3595; G01N 2021/8466; G01S 17/08; G01S 17/89; G06T 5/50; G06T 7/0002; G06T 7/0012; G06T 2207/10032; G06T 2207/30188
See application file for complete search history.

(56) References Cited

FOREIGN PATENT DOCUMENTS

| | | |
|---|---|---|
| JP | 5162890 B2 | 3/2013 |
| JP | 2017035055 A | 2/2017 |
| JP | 2018534714 A | 11/2018 |
| WO | WO-2015145764 A1 | 10/2015 |

OTHER PUBLICATIONS

Jenerowicz, et al., "The pan-sharpening of satellite and UAV imagery for agricultural applications", Proceedings of SPIE, SPIE Remote Sensing, vol. 9998, XP060079994, Oct. 25, 2016, pp. 99981S-99981S.

Gevaert, et al., "A comparison of STARFM and an unmixing-based algorithm for Landsat and MODIS data fusion", Department of Earth Observation Science, vol. 156, XP055731155, Jan. 1, 2015, pp. 34-44.

Gao, et al., "Simple method for retrieving leaf area index from Landsat using MODIS leaf area index products as reference", Journal of Applied Remote Sensing, vol. 6, No. 1, XP055731206, Jul. 18, 2012, p. 063554.

Darvishzadeh, et al., "Analysis of Sentinel-2 and Rapid Eye for Retrieval of Leaf Area Index in a Saltmarsh Using a Radiative Transfer Model", Remote Sensing, MDPI, XP055734108, vol. 11, No. 6, Mar. 20, 2019, p. 671.

Hanya, Issei et al, "Estimation of Moisture Content of Wheat Ear Using Satellite and Helicoper Imagry", Environmental Information Scientific Journal, 2009, vol. 23, Japan, Twenty Third Environmental Information Scientific Science, vol. 2011, Jan. 15, 2002, pp. 155 to 160.

* cited by examiner

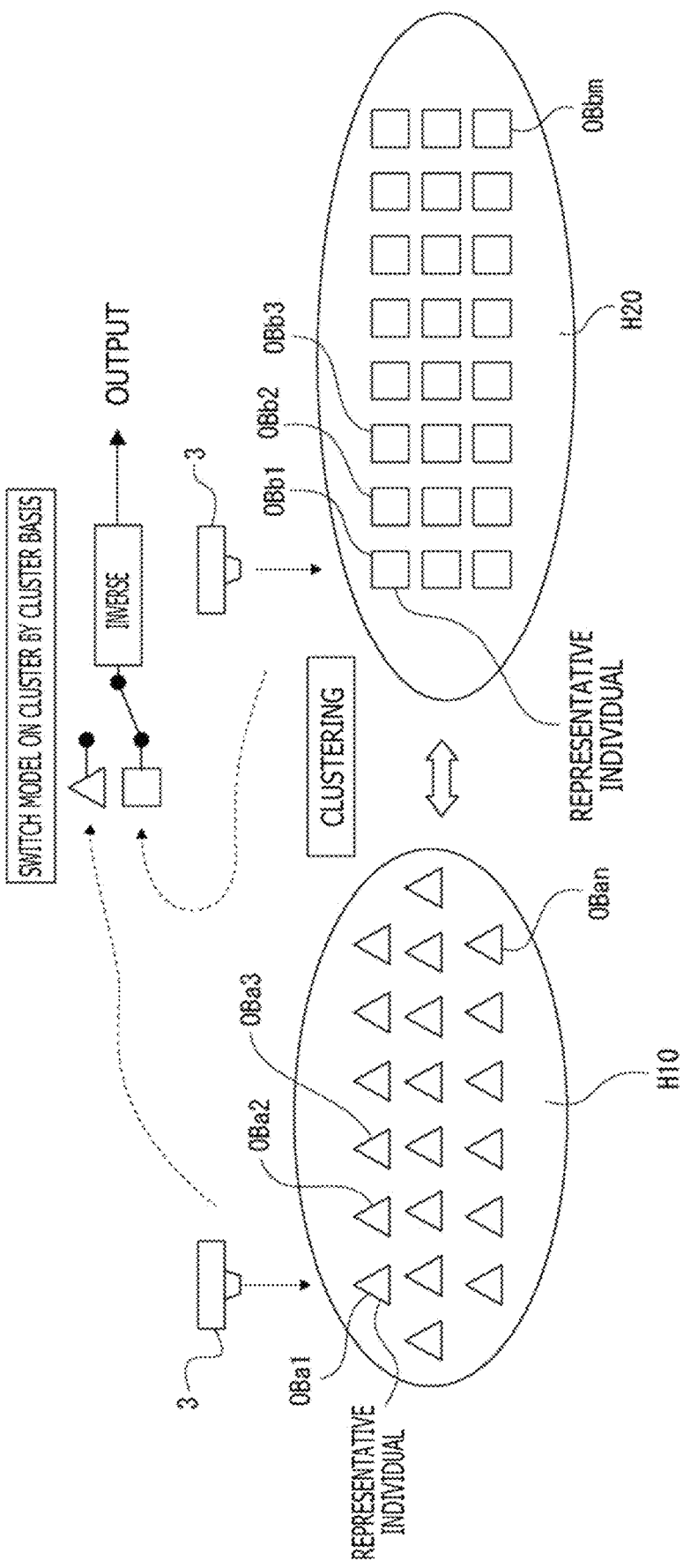

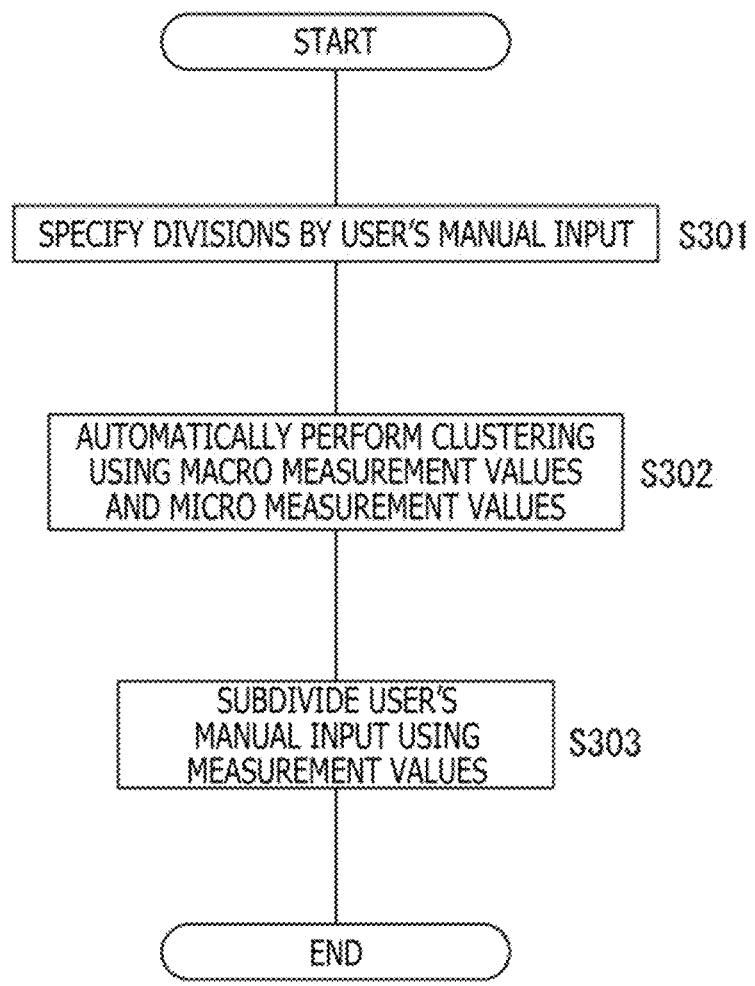

MICRO MEASUREMENT MODEL PARAMETER

|  | CL3 | CL4 | CL1 |
|---|---|---|---|
| LAI | 1.3 | 0.8 | 3.0 |
| AVERAGE LEAF ANGLE | 13 DEGREES | 25 DEGREES | 40 DEGREES |
| SUN LEAF ANGLE | 0.8 | 0.7 | 0.55 |

COMPLEMENTARY ANALYSIS RESULTS

| 0.006 | 0.030 | 0.015 | 0.012 |
| 0.028 | 0.025 | 0.008 | 0.019 |
| 0.021 | 0.015 | 0.028 | 0.020 |
| 0.005 | NoData | NoData | NoData |

COLOR MAPPING

FIG. 17A
COMPLEMENTARY ANALYSIS RESULTS
| 0.006 | 0.030 | 0.015 | 0.012 |
|---|---|---|---|
| 0.028 | 0.025 | 0.008 | 0.019 |
| 0.021 | 0.015 | 0.028 | 0.020 |
| 0.005 | NoData | NoData | NoData |
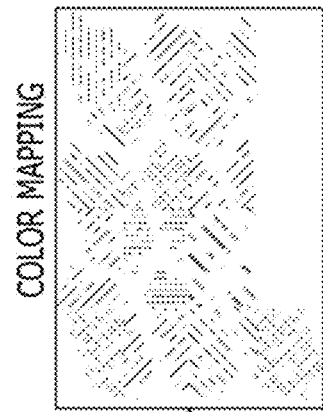
FIG. 17C
COLOR MAPPING
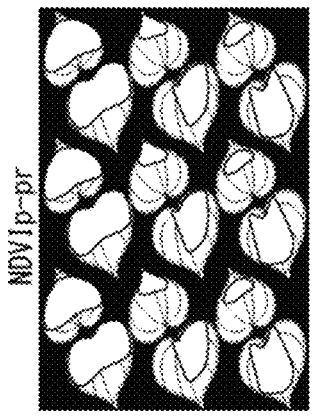
FIG. 17B
NDVIp-pr FIG. 18A
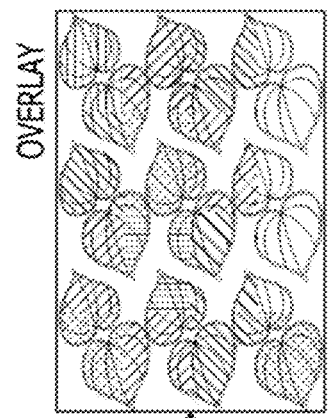
FIG. 18B
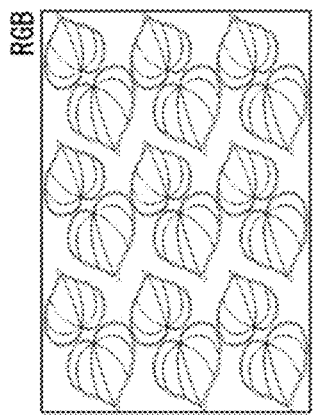
FIG. 18C

INFORMATION PROCESSING APPARATUS, INFORMATION PROCESSING METHOD, PROGRAM, AND SENSING SYSTEM

CROSS REFERENCE TO RELATED APPLICATIONS

This application is a U.S. National Phase of International Patent Application No. PCT/JP2020/025083 filed on Jun. 25, 2020, which claims priority benefit of Japanese Patent Application No. JP 2019-124764 filed in the Japan Patent Office on Jul. 3, 2019. Each of the above-referenced applications is hereby incorporated herein by reference in its entirety.

TECHNICAL FIELD

The present technique relates to an information processing apparatus, an information processing method, a program, and a sensing system, and in particular to a technique suitable for generation of a measurement result for a vegetation state or the like.

BACKGROUND ART

Much effort has been made to remotely sense a vegetation state by, for example, using an imaging apparatus mounted in a small flying body such as a drone to image the vegetation state of plants while the flying body is flying over a farm field.

PTL 1 discloses a technique for performing remote sensing by imaging the farm field.

CITATION LIST

Patent Literature

[PTL 1]
Japanese Patent No. 5162890

SUMMARY

Technical Problem

Such remote sensing allows, in addition to measurement of shapes based on measurement of visible light (R (red), G (green), and B (blue)), measurement of physical properties, a physiological state, and the like of a target using various optical wavelengths and methods. However, a sensing device that can be mounted in the small flying body is often limited in size, weight, and the like.

For example, a hyper spectrum camera that can acquire a large number of wavelengths and perform component analysis and the like may typically need a scanning mechanism configured to acquire two-dimensional images, and is large in size. The hyper spectrum camera is thus difficult to mount in a drone or the like, which is small in size.

On the other hand, for sensing using an artificial satellite, artificial satellites are in operation in which advanced equipment that can perform advanced sensing is mounted. However, such sensing is insufficient in terms of a spatial resolution.

A low spatial resolution not only precludes determination of shapes but also prevents measurement only of a target to be examined due to mixture of various targets in one spatial resolution unit.

To cover the low spatial resolution, measurement values for a specific target have been determined based on inverse model calculation (inverse calculation) using a model including information regarding the form of a measurement target (for example, a model associating "shape" with "character/environmental response," or the like, specifically, such as a radiation transfer characteristic model). However, in actuality, discrepancy in shape or the like between the measurement target and the model makes accurate measurement difficult.

Thus, it is desirable to provide a system that can obtain a more accurate measurement result in remote sensing based on a high-performance sensor using, for example, an artificial satellite, and an information processing apparatus for the system.

Solution to Problem

An information processing apparatus according to an embodiment of the present technique includes a macro measurement analysis calculation section configured to calculate detection data from a macro measurement section adapted to perform sensing at a first spatial resolution for a first measurement range for a measurement target; a micro measurement analysis calculation section configured to calculate detection data from a micro measurement section adapted to perform sensing at a second spatial resolution for a second measurement range, the second spatial resolution being higher than the first spatial resolution, the second measurement range being included in the first measurement range for the measurement target; and an inverse model calculation section configured to acquire a model parameter used for an inverse model calculation using a calculation result from the macro measurement analysis calculation section, on the basis of the detection data from the micro measurement section determined by the micro measurement analysis calculation section.

The model parameter used for the inverse calculation is generated on the basis of a measurement result at the second spatial decomposition.

Additionally, in the information processing apparatus according to the embodiment of the present technique described above, the inverse model calculation section may use the model parameter based on the detection data from the micro measurement section determined by the micro measurement analysis calculation section, as a parameter for an inverse model in the inverse model calculation using the calculation result from the macro measurement analysis calculation section.

Advanced measurement can be achieved on the basis of the inverse model calculation using macro measurement that enables high-performance sensing. In this case, the parameter based on actual measurement and obtained through the sensing at a high spatial resolution are used as the parameter for the inverse model.

In the information processing apparatus according to the embodiment of the present technique described above, the inverse model calculation section may use the model parameter based on the detection data for the second measurement range to determine a calculation result in units of the first spatial resolution.

The inverse model calculation section determines the calculation result in the form of, for example, a character or an environmental response. In this case, the calculation result is determined in units of the first spatial resolution related to the macro measurement section, using the model parameter for the second measurement range related to the micro measurement section.

In the information processing apparatus according to the embodiment of the present technique described above, the inverse model calculation section may determine a character or an environmental response of the measurement target as a calculation result in units of the first spatial resolution.

The character refers to a static shape or characteristics of the measurement target. The environmental response refers to a dynamic shape or characteristics of the measurement target.

In the information processing apparatus according to the embodiment of the present technique described above, the macro measurement section may perform sensing at a longer distance from the measurement target than the micro measurement section.

The macro measurement section performs measurement over a wider measurement range at a longer distance from the measurement target than the micro measurement section. On the other hand, the micro measurement section performs measurement within a relatively narrow measurement range at a shorter distance from the measurement target than the macro measurement section.

In the information processing apparatus according to the embodiment of the present technique described above, the inverse model calculation section may acquire a model parameter for a representative individual for each measurement area where clustering is performed, switch the model parameter for each clustered measurement area, and apply the resultant model parameter to the inverse model.

By calculating the detection data from the micro measurement section to determine the model parameter for each of the measurement areas resulting from the clustering, the inverse model calculation section can use different model parameters for the respective measurement areas resulting from the clustering.

In the information processing apparatus according to the embodiment of the present technique described above, the clustering may be performed on the basis of user input that specifies areas.

For example, a farm field is divided into, for example, areas where different crops are cultivated. For example, the user such as a farmer can input such information.

In the information processing apparatus according to the embodiment of the present technique described above, the clustering may be performed on the basis of the detection data from the macro measurement section or the detection data from the micro measurement section.

For example, the use of the detection data from the macro measurement section or the micro measurement section allows the areas with clearly different shapes or statuses to be discriminated from one another, and thus clustering calculation is automatically performed.

In the information processing apparatus according to the embodiment of the present technique described above, the clustering may be performed on the basis of the user input that specifies areas, and the detection data from the macro measurement section or the detection data from the micro measurement section.

That is, clustering calculation reflecting both manual input and automatic discrimination is performed.

In the information processing apparatus according to the embodiment of the present technique described above, the model parameter may include any of a three-dimensional structure of plants, a height of the plants, an average leaf angle (average leaf inclination), a plant coverage, an LAI, a chlorophyll concentration, spectral characteristics of soil, or a sun leaf ratio.

Note that the LAI (Leaf Area Index) is an index of leaf area representing the amount of leaves of plants such that larger values indicate more leaves.

In the information processing apparatus according to the embodiment of the present technique described above, the micro measurement section may include, as a micro measurement sensor, any of a visible-light image sensor, a stereo camera, a sensor for laser image detection and ranging, a polarization sensor, or a ToF (Time of Flight) sensor.

Note that the sensor for laser image detection and ranging is known as what is called a Lidar (light detection and ranging).

In the information processing apparatus according to the embodiment of the present technique described above, the macro measurement section may include, as a macro measurement sensor, any of a multi spectrum camera, a hyper spectrum camera, an FTIR (Fourier Transform Infrared Spectroscopy), or an infrared sensor.

The information processing apparatus according to the embodiment of the present technique described above may further include an output section configured to generate and outputting output image data on the basis of a calculation result from the inverse model calculation section.

That is, the information processing apparatus allows information regarding the calculation result from the inverse model calculation section to be imaged and presented to a user.

In the information processing apparatus according to the embodiment of the present technique described above, the output section may generate output image data resulting from color mapping of the calculation result from the inverse model calculation section.

In a case where the calculation result from the inverse model calculation section is obtained for each of a plurality of areas, the image presented to the user is generated such that a different color is allocated to each of the areas.

In the information processing apparatus according to the embodiment of the present technique described above, the output section may generate output image data resulting from synthesis of an image resulting from color mapping of the calculation result from the inverse model calculation section and another image.

The image in which a different color is allocated to each area and another image are synthesized by, for example, overlaying or overwriting.

In the information processing apparatus according to the embodiment of the present technique described above, the macro measurement section may be mounted in an artificial satellite.

The macro measurement section is mounted in the artificial satellite to measure a measurement target such as a farm field from a distant position in the sky.

In the information processing apparatus according to the embodiment of the present technique described above, the micro measurement section may be mounted in a flying body enabled to be radio-controlled or automatically controlled.

Examples of the flying body enabled to be radio-controlled or automatically controlled include what is called a drone, a small radio-controlled fixed-wing airplane, a small radio-controlled helicopter, and the like.

An information processing method according to another embodiment of the present technique includes: executing, by an information processing apparatus, macro measurement analysis processing of calculating detection data from a macro measurement section configured to perform sensing at a first spatial resolution for a first measurement range for a measurement target; executing, by the information processing apparatus, micro measurement analysis processing of calculating detection data from a micro measurement section configured to perform sensing at a second spatial resolution for a second measurement range, the second spatial resolution being higher than the first spatial resolution, the second measurement range being included in the first measurement range for the measurement target; and executing, by the information processing apparatus, inverse model calculation processing of acquiring a model parameter used for an inverse model calculation using a calculation result in the macro measurement analysis processing, on the basis of the detection data from the micro measurement section determined in the micro measurement analysis processing.

Thus, the information processing apparatus can generate, for the measurement target, advanced and accurate measurement result information resulting from combination of macro measurement and micro measurement.

A program according to a further embodiment of the present technique is a program causing the information processing apparatus to execute the above-described method. This facilitates implementation of a computer apparatus generating an advanced measurement result.

A sensing system according to a further embodiment of the present technique includes: a macro measurement section configured to perform sensing at a first spatial resolution for a first measurement range for a measurement target; a micro measurement section configured to perform sensing at a second spatial resolution for a second measurement range, the second spatial resolution being higher than the first spatial resolution, the second measurement range being included in the first measurement range for the measurement target; and the information processing apparatus described above.

Thus, a system can be constructed that performs macro measurement and micro measurement and further uses results of those measurements to generate a measurement result.

BRIEF DESCRIPTION OF DRAWINGS

FIG. 6 is a descriptive diagram of clustering according to the embodiment.

FIG. 12 is a flowchart of clustering according to the embodiment.

FIGS. 17A, 17B, and 17C illustrate diagrams of synthesis of a color mapping image and another image according to the embodiment.

FIGS. 18A, 18B, and 18C illustrate diagrams of synthesis of a color mapping image and another image according to the embodiment.

DESCRIPTION OF EMBODIMENT

An embodiment will be described in the following order.
<1. Configuration of Sensing System>
<2. Configuration of Information Processing Apparatus>
<3. Processing Example>
<4. Various Examples>
<5. Conclusion and Modified Examples>

1. CONFIGURATION OF SENSING SYSTEM

First, a sensing system according to the embodiment will be described.

Figure 1:
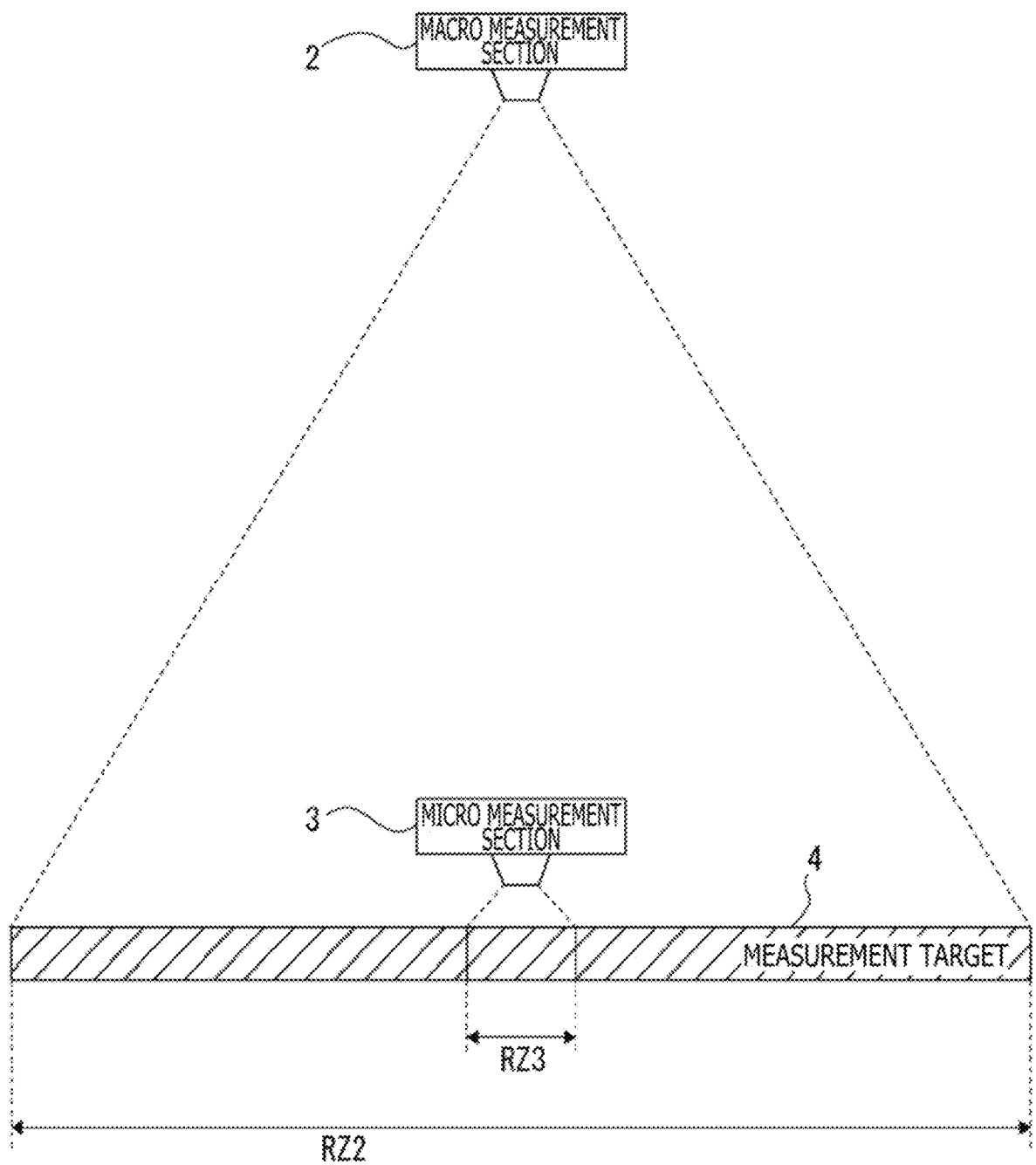
FIG. 1 is a descriptive diagram of macro measurement section and a micro measurement section in a sensing system according to an embodiment of the present technique.

FIG. 1 illustrates a macro measurement section 2 and a micro measurement section 3 included in the sensing system.

The micro measurement section 3 performs sensing at a position relatively near a measurement target 4. A measurement range in which one unit of sensing is performed is a relatively narrow range indicated as a micro measurement range RZ3. Note that one unit as used herein refers to, for example, in a case of a camera, a range within which one frame of image is captured, though the unit may vary depending on a sensor type.

In contrast, the macro measurement section 2 performs sensing at a position farther from the measurement target 4 than the micro measurement section 3. A measurement range within which one unit of sensing is performed is indicated as a macro measurement range RZ2 wider than the micro measurement range RZ3. However, the measurement range within which one unit of sensing is performed by the macro measurement section 2 may be the same as the micro measurement range RZ3.

In the present embodiment, the micro measurement range RZ3 is the same as or narrower than the macro measurement range RZ2. That is, the area of the micro measurement range RZ3 in the measurement target 4 is also covered by the macro measurement range RZ2. In other words, the micro measurement range RZ3 is a range within which both micro measurement by the micro measurement section 3 and macro measurement by the macro measurement section 2 are performed.

Figure 2:
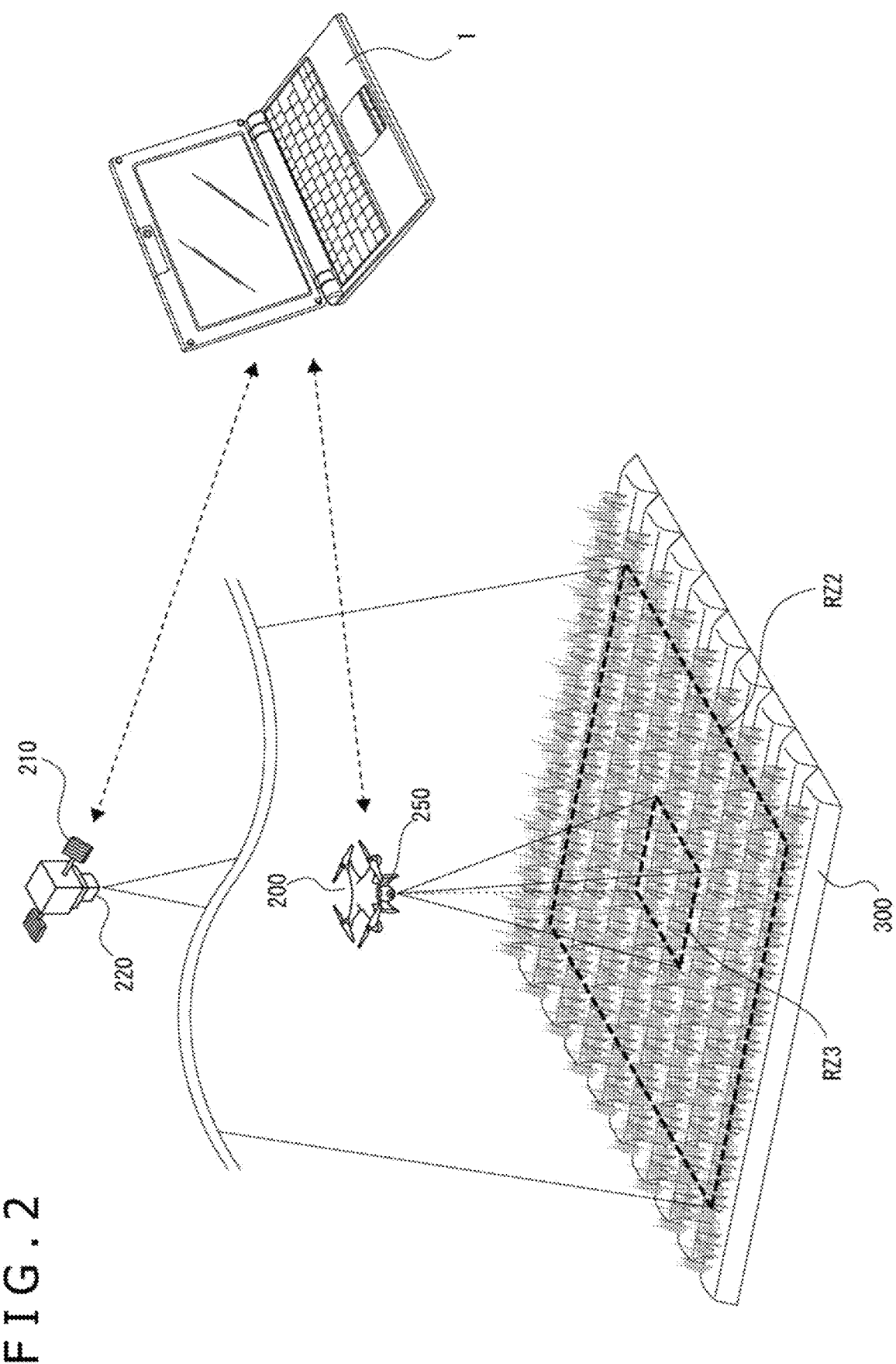
FIG. 2 is a descriptive diagram of an example of remote sensing of a farm field according to the embodiment.

An example of a sensing system using the macro measurement section 2 and the micro measurement section 3 as described above is a system that senses, for example, a vegetation state of a farm field 300 as illustrated in FIG. 2.

FIG. 2 illustrates the state of the farm field 300. Recently, much effort has been made to remotely sense a vegetation state using an imaging apparatus 250 mounted in a small flying body 200, for example, a drone as illustrated in FIG. 2.

The flying body 200 can fly over the farm field 300 by, for example, being radio-controlled by an operator or being automatically controlled.

The imaging apparatus 250 is set in the flying body 200 to image, for example, an area below the flying body 200. When the flying body 200 flies over the farm field 300 along a predetermined route, the imaging apparatus 250, for example, periodically captures still images.

The imaging apparatus 250 installed in the flying body 200 as described above is used as the micro measurement section 3 in FIG. 1. Images captured by the imaging apparatus 250 are used as detection data for micro measurement. An imaging range of the imaging apparatus 250 corresponds to the micro measurement range RZ3.

Additionally, FIG. 2 illustrates an artificial satellite 210 positioned in the sky. An imaging apparatus 220 is installed in the artificial satellite 210 and can sense an earth's surface side.

The imaging apparatus 220 can sense (image) the farm field 300. That is, the imaging apparatus 220 is used as the macro measurement section 2. Images captured by the imaging apparatus 220 are used as detection data for macro measurement. An imaging range of the imaging apparatus 220 corresponds to the macro measurement range RZ2.

The imaging apparatus 250 used as the micro measurement section 3 mounted in the flying body 200, in other words, the specific micro measurement sensor is assumed to be a visible-light image sensor (an image sensor imaging visible light in R (red), G (green), and B (blue)), a stereo camera, a Lidar (a sensor for laser image detection and ranging), a polarization sensor, a ToF sensor, an NIR (Near Infra Red) imaging camera, or the like.

Additionally, the micro measurement sensor may be a multi spectrum camera performing imaging in a plurality of wavelength bands, capturing NIR images and R (red) images, for example, and being capable of calculating an NDVI (Normalized Difference Vegetation Index) on the basis of an image obtained, as long as the sensor has a device size at which the sensor can be operatively mounted in the flying body 200. The NDVI is an index indicating the distribution status and activity of vegetation.

The above-described sensors are desirably suitable for analyzing, for example, a character, an environmental response, an environmental state (range, distribution, etc.), and the like of the measurement target. Note that the character is the static shape and characteristics of the measurement target. The environmental response is the dynamic shape and characteristics of the measurement target. The environmental state is the state of the environment in which the measurement target is present and includes the range within which the measurement target is present, the distribution of the measurement target, or the characteristics of the environment.

Additionally, the sensors are desirably relatively small in size and light in weight and are easily mounted in the flying body 200.

On the other hand, the imaging apparatus 220 used as the macro measurement section 2 mounted in the artificial satellite 210, in other words, the specific macro measurement sensor may be a multi spectrum camera capturing images in a plurality of wavelength bands (for example, NIR images and R images), a hyper spectrum camera, an FTIR (Fourier Transform Infrared Spectroscopy), an infrared sensor, or the like. In this case, a relatively large-scale sensing device is accepted and assumed to be capable of accurate sensing.

These macro measurement sensors are sensors suitable for analyzing various physical property values, for example, information regarding photosynthesis or the like.

Additionally, the sensors are difficult to mount in the small flying body 200 due to the device size, weight, or the like. However, in the sensing system in the present example, such a sensor is mounted in the artificial satellite 210.

Additionally, tag information is attached to images captured and obtained by the imaging apparatuses 220 and 250. The tag information includes imaging date and time information, position information (latitude/longitude information) in the form of GPS (Global Positioning System) data, imaging apparatus information (individual identification information and model information regarding the camera and the like), information regarding each image data (information such as image size, wavelengths, and imaging parameters), and the like.

Note that the position information and the imaging date and time information are also used as information associating an image (detection data) from the imaging apparatus 220 with an image (detection data) from the imaging apparatus 250.

As described above, image data and tag information obtained by the imaging apparatus 250 mounted in the flying body 200 and the imaging apparatus 220 mounted in the artificial satellite 210 are transmitted to the information processing apparatus 1. The information processing apparatus 1 uses the image data and tag information to generate analysis information using the farm field 300 as a measurement target. Additionally, the information processing apparatus 1 executes processing of presenting analysis results to the user as images.

The information processing apparatus 1 is implemented as, for example, a PC (personal computer), an FPGA (field-programmable gate array), a terminal apparatus such as a smart phone or a tablet, or the like.

Note that FIG. 1 illustrates the information processing apparatus 1 as separated from the imaging apparatus 250, but, for example, a calculation apparatus (microcomputer or the like) used as the information processing apparatus 1 may be provided in a unit including the imaging apparatus 250.

Figure 3:
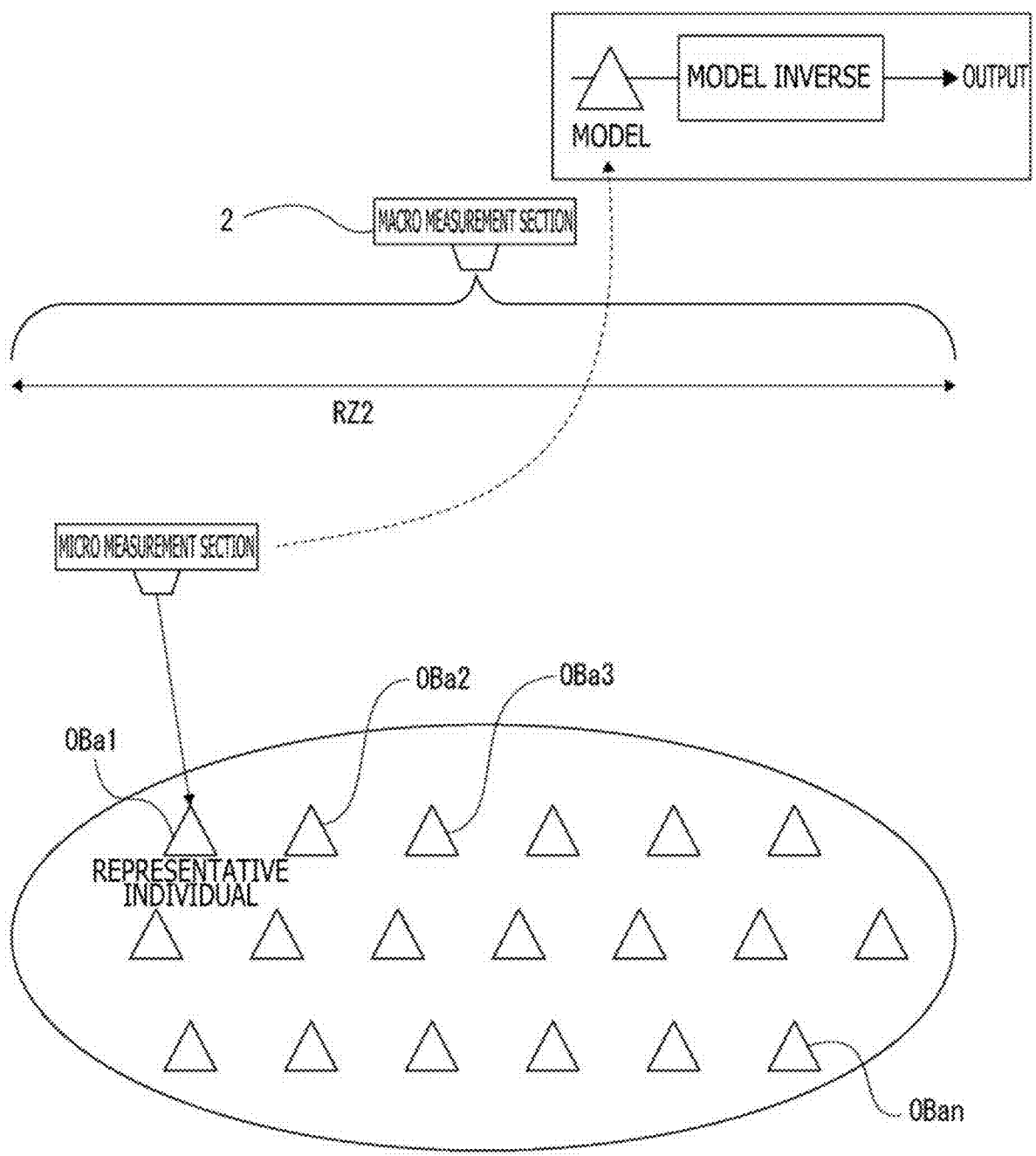
FIG. 3 is a descriptive diagram of measurement of the macro measurement section and the micro measurement section according to the embodiment.

With reference to FIG. 3, roles of the macro measurement section 2 and the micro measurement section 3 will be described.

The macro measurement section 2 performs measurement within the measurement range RZ2 and executes an inverse calculation using a model to obtain an output or a measurement result for vegetation or the like. For example, by using a prepared model to interpret macro measurement values, a correct output is obtained from the mixture of measurement values.

However, in a case where there is discrepancy between the model used for the inverse model calculation and an actual measurement target, an accurate output fails to be obtained. In particular, plants and animals change in shape due to growth or vary significantly in shape according to breed, and thus the model is often not appropriate.

Thus, measurement values for a representative individual are used to update the model. For this purpose, the detection data from the micro measurement section is used.

The micro measurement section 3 can measure each of individuals to be measured. For example, individuals OBa1, OBa2, OBa3, . . . OBan are illustrated, and the micro measurement section 3 can measure or determine the character, environmental response, and environmental state of each individual, identification of areas based on the character, the environmental response, and the environmental state, and the like.

The detection data from the micro measurement section 3 is used to measure the character or environmental response of the representative individual, and the character or the environmental response is used to change the model parameters. Then, the inverse model calculation can be performed using a model based on actual measurement.

A main object of the measurement using the sensing system is a macro trend (average, totaling, distribution, and the like) that can be obtained by a model inverse calculation using information based on the detection data from the macro measurement section 2. In this case, measurement accuracy is ensured by updating the model parameters on the basis of the detection data from the micro measurement section 3.

Figure 4A:
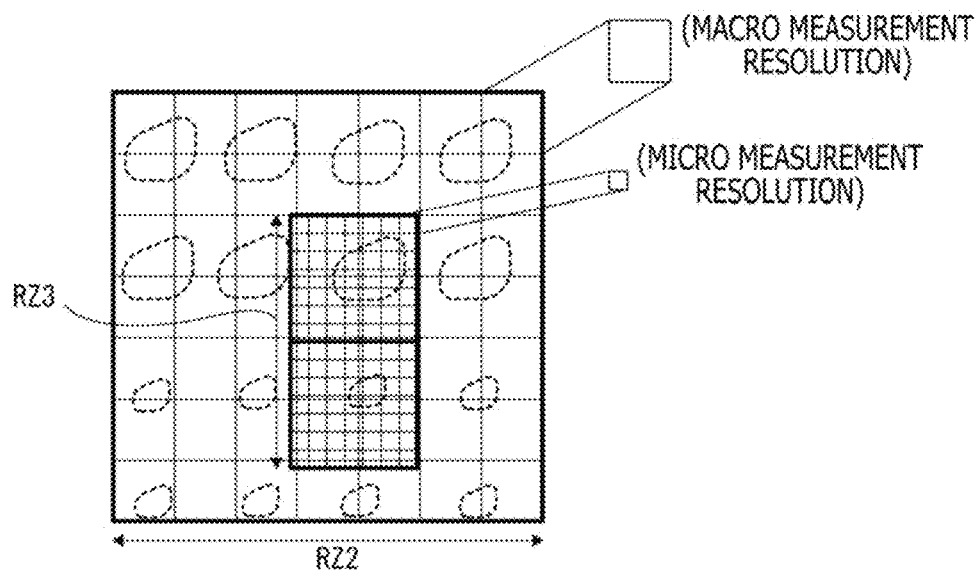
FIGS. 4A, 4B, and 4C illustrate diagrams of measurement ranges and resolutions of the macro measurement section and the micro measurement section according to the embodiment.

FIG. 4A two-dimensionally illustrates the macro measurement range RZ2 and the micro measurement range RZ3 and also illustrates the resolutions of the macro measurement section 2 and the micro measurement section 3.

Large cells each indicate a macro measurement resolution, whereas small cells each indicate a micro measurement resolution. Information obtained using the resolutions corresponds to, for example, information of one pixel of a captured image.

That is, the macro measurement sensor mounted in the macro measurement section 2 is a sensor having the resolution corresponding to the large cells, whereas the micro measurement sensor mounted in the micro measurement section 3 is a sensor having the resolution corresponding to the small cells.

For example, given a measurement target as illustrated by a dashed line, the character, environmental response, area, and the like of the measurement target can be determined using the resolution corresponding to the small cells illustrated by thin lines, and physical property values and the like can be measured using the resolution corresponding to the large cells illustrated by thick lines.

A background for the need of such a sensing system will be described.

As described above, sensing using the flying body 200 such as a drone has recently frequently been performed. This allows, in addition to measurement of the character based on measurement of visible light (RGB), measurement of physical properties, a physiological state, and the like of a target using various optical wavelengths and techniques. However, a sensing device that can be mounted in the small flying body 200 is often limited in size, weight, and the like.

A hyper spectrum camera that acquires a large number of wavelengths and that can perform component analysis and the like may typically need a scanning mechanism in order to acquire two-dimensional images, and is large in size. The hyper spectrum camera is thus difficult to mount unless the flying body is large.

Additionally, scanning may need a certain amount of time and may also need hovering, leading to an extended measurement time. The scanning also often precludes measurement of a large land with the capacity of batteries in the flying body 200.

Additionally, during scanning, possible vibration of the flying body 200 may reduce measurement accuracy.

Additionally, the FTIR scheme, which uses a higher spectral resolution, in principle involves equipment that is large in length and that is difficult to mount in the flying body 200.

For accurate sensing, an S/N (signal-noise ratio) can be improved by mounting a large imager or providing multi-exposure. However, the large imager includes a large optical system and is unsuitable for mounting in the flying body 200. The multi-exposure leads to an extended measurement time due to hovering of the flying body 200, and possible vibration of the flying body 200 reduces accuracy.

Additionally, in general, a housing of the flying body 200 is exposed to sunlight and has a temperature higher than the normal temperature.

In accurate sensing, the sensor is kept at low temperature to enable a reduction in thermal noise. Some sensors such as a spectrophotometer which are used indoors are kept accurate by being kept at low temperature using a Peltier element or the like. However, the Peltier element consumes a large amount of power and is thus unsuitable for mounting in the flying body 200 with limited power.

A heat pump type temperature adjustment device using a compressor as in an air conditioner has a high power efficiency but is not appropriate in size or weight to mount in the flying body 200.

On the other hand, in satellite sensing, artificial satellites are in operation in which equipment enabling advanced sensing is mounted. However, the satellite sensing is insufficient in terms of a spatial resolution.

Mounting of a hyper spectrum camera, an FTIR, or a large imager, and low temperature control as described above and the like are not so difficult for the artificial satellite 210.

However, a low spatial resolution not only precludes determination of shapes but also prevents measurement only of a target to be examined due to mixture of various targets in one spatial resolution unit. In particular, in an example of vegetation measurement, soil, a shadow, or the like is disadvantageously mixed.

More specifically, in remote sensing using the artificial satellite 210, measurement is performed from a distant position, and thus, besides an object to be measured, a different object is mixed in one pixel corresponding to the spatial resolution of a measuring instrument. A measurement value is weighted according to the ratio of each object in the pixel and is referred to as a mixel (Mixed Pixel). For example, when vegetation is to be measured, a mixture of plants and soil is measured, preventing determination of the physical property values (chlorophyll concentration and the like) of the plants themselves.

To solve such a problem, various methods have been proposed.

"SAVI (Soil-adjusted Vegetation Index)" is a vegetation index used to correct a fluctuation caused by the reflectance of the soil. When LAI is represented as "L," L=0 (equal to NDVI) is used for a high LAI and L=1 is used for a low LAI.

$$SAVI = ((NIR-RED)/(NIR+RED+L)) \times (1+L)$$

However, an assumed value may need to be used as a value for the LAI, precluding precise correction in a case where the LAI may vary with location as in an agricultural field.

Furthermore, the adverse effect affecting the remote sensing is not limited to the two-dimensional ratio of objects. Reflection from plant leaves is not Lambertian refection and is affected by an incidence angle from a light source, an angular dependence of leaves, and the angle of the measuring instrument (this effect is generally referred to as BRDF).

The three-dimensional shape of plants causes shadows, multiple reflections of light beams in a community, and the like, thus fluctuating measurement values.

To deal with such a complicated mechanism, a radiation transfer model of a leaf describing the angular dependence of the reflectance (example: PROSAIL model) or an optical model of a community including shadows are used to model optical behaviors.

That is, to cover the low spatial resolution in the satellite sensing and to deal with complicated factors affecting measurement, an inverse calculation using a "model (radiation transfer characteristic model or the like)" including information regarding the form of the measurement target is used to determine measurement values for a specific target.

However, this is appropriate in a case where there is no discrepancy between the extension of the measurement target and the shape of the model (as in a tropical rainforest in a case of vegetation), but for example, in measurement (scouting) of the farm field 300, the shape itself is to be measured and is precluded from being identified or correctly measured. For example, the character and the like are unknown because, for example, crops change in shape during the process of growth or because, for some reason, the crops are prevented from growing appropriately or are about to die down.

Figure 5B:
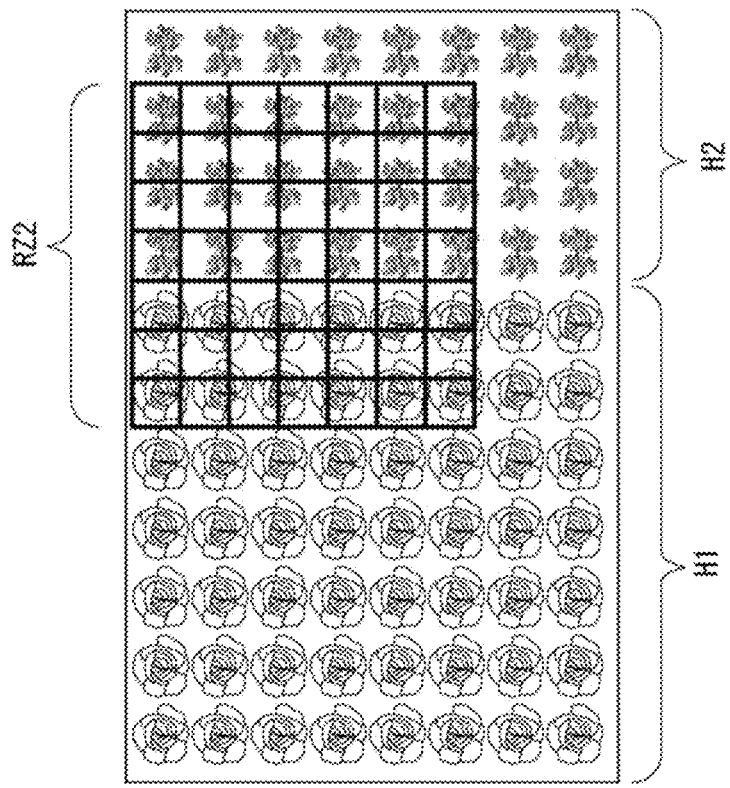
FIGS. 5A and 5B illustrate diagrams of a case where an inverse calculation leads to an incorrect result.
Figure 5A:
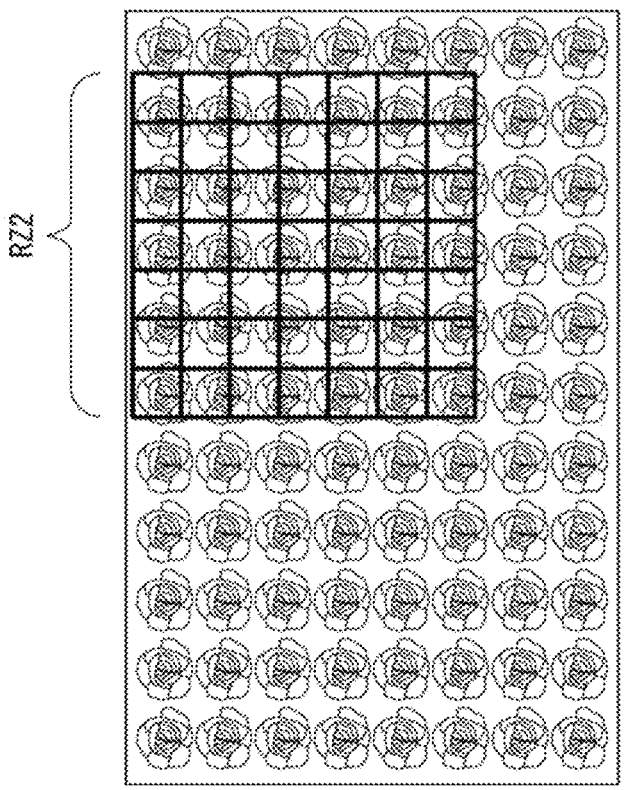

For example, FIG. 5A illustrates that plant individuals with substantially the same shape are widely arranged in lines, and for example, the LAI is substantially uniform within the macro measurement range RZ2.

On the other hand, FIG. 5B illustrates an area H1 in which plants with large leaves (grown large) are planted and an area H2 in which plants with small leaves are planted. The illustrated macro measurement range RZ2 extends across the areas H1 and H2. In this case, the LAI or the height of the plant varies with location. Thus, there may be a large discrepancy between the macro measurement range RZ2 and the model used for the inverse model calculation.

Thus, in the sensing system according to the embodiment, high-resolution measurement by the micro measurement section 3 includes measurement of the state of plants in the actual field (LAI, plant coverage and height, average angle of leaves, chlorophyll concentration, and the like), an installation status of ridges, and the like, and parameters for a real object are used for the inverse model calculation for the satellite sensing. This allows measurement even in a case where the measurement target has a varying shape or state or has a shape different from a standard shape indicated by the model.

In a specific example, an inverse model calculation is performed using the parameters for the real object based on the detection data from the micro measurement section 3. Thus, even in a case where the shape and state of the measurement target are unknown, a correct SIF (Solar-Induced chlorophyll Fluorescence) is calculated to obtain information regarding a photosynthesis rate.

The model parameters are assumed to be the three-dimensional structure of plants, the height of the plants, the average leaf angle, the plant coverage, the LAI, the chlorophyll concentration, the spectral characteristics of the soil, a sun leaf ratio, and the like.

Additionally, the sensing system according to the embodiment further includes the idea of clustering. In other words, the sensing system includes the ideas of clustering for dividing the measurement target area into clusters, measurement of the representative individual for each cluster, and switching the model on a cluster-by-cluster basis.

FIG. 6 schematically illustrates a case where sensing is performed in each of certain areas H10 and H20.

It is assumed that individuals OBa1, OBa2, OBa3, . . . OBan are present in the area H10 and that individuals OBb1, OBb2, OBb3, . . . OBbn having a character different from the character of the individuals OBa1, OBa2, OBa3, . . . OBan are present in the area H20.

Clustering processing is used to cause the areas H10 and H20 to be recognized as different clusters.

Additionally, for each of the clusters, the representative individual is measured to determine the model parameters.

Different model parameters are used for the respective clusters.

That is, in a case where the macro measurement section 2 and the micro measurement section 3 are used to measure the area H10, the inverse model calculation is performed using the model parameters based on the representative individual for the relevant cluster.

In a case where the macro measurement section 2 and the micro measurement section 3 are used to measure the area H20, the inverse model calculation is performed using the model parameters based on the representative individual for the relevant cluster.

In this manner, different models are used for the respective areas resulting from the clustering to obtain accurate measurement results.

Figure 4B:
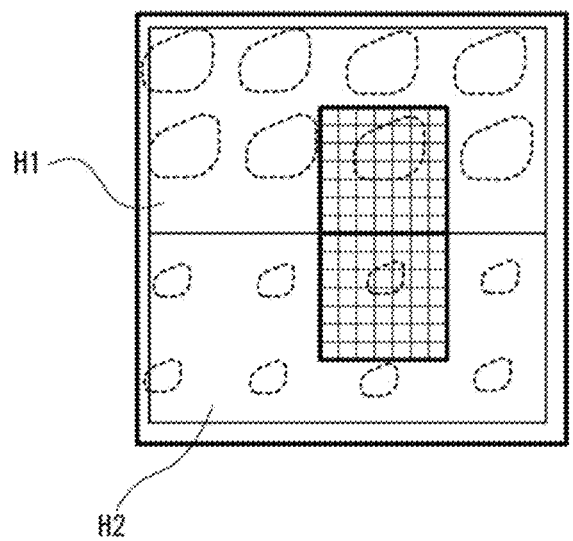

Additionally, in FIGS. 4A and 4B, the measurement target individuals are illustrated by dashed lines, but in this figure, the micro measurement section 3 covers both the areas H1 and H2. The areas H1 and H2 are assumed to include, as different plants or the like, for example, populations having different leaf size (manner of growth) as illustrated in FIG. 5B.

Figure 4C:
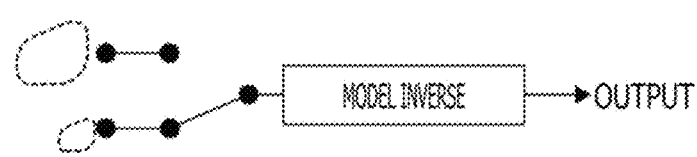

Also in this case, the following configuration is possible: the inverse model calculation is performed such that, for the macro measurement range RZ2, a model based on the micro measurement for the area H1 is used for a portion related to the area H1, and a model based on the micro measurement for the area H2 is used for a portion related to the area H2. FIG. 4C schematically illustrates switching of the model used for the inverse model calculation.

2. CONFIGURATION OF INFORMATION PROCESSING APPARATUS

The information processing apparatus 1 in the sensing system described above will be described that acquires detection information from the macro measurement section 2 and the micro measurement section 3 and executes processing such as analysis.

Figure 7:
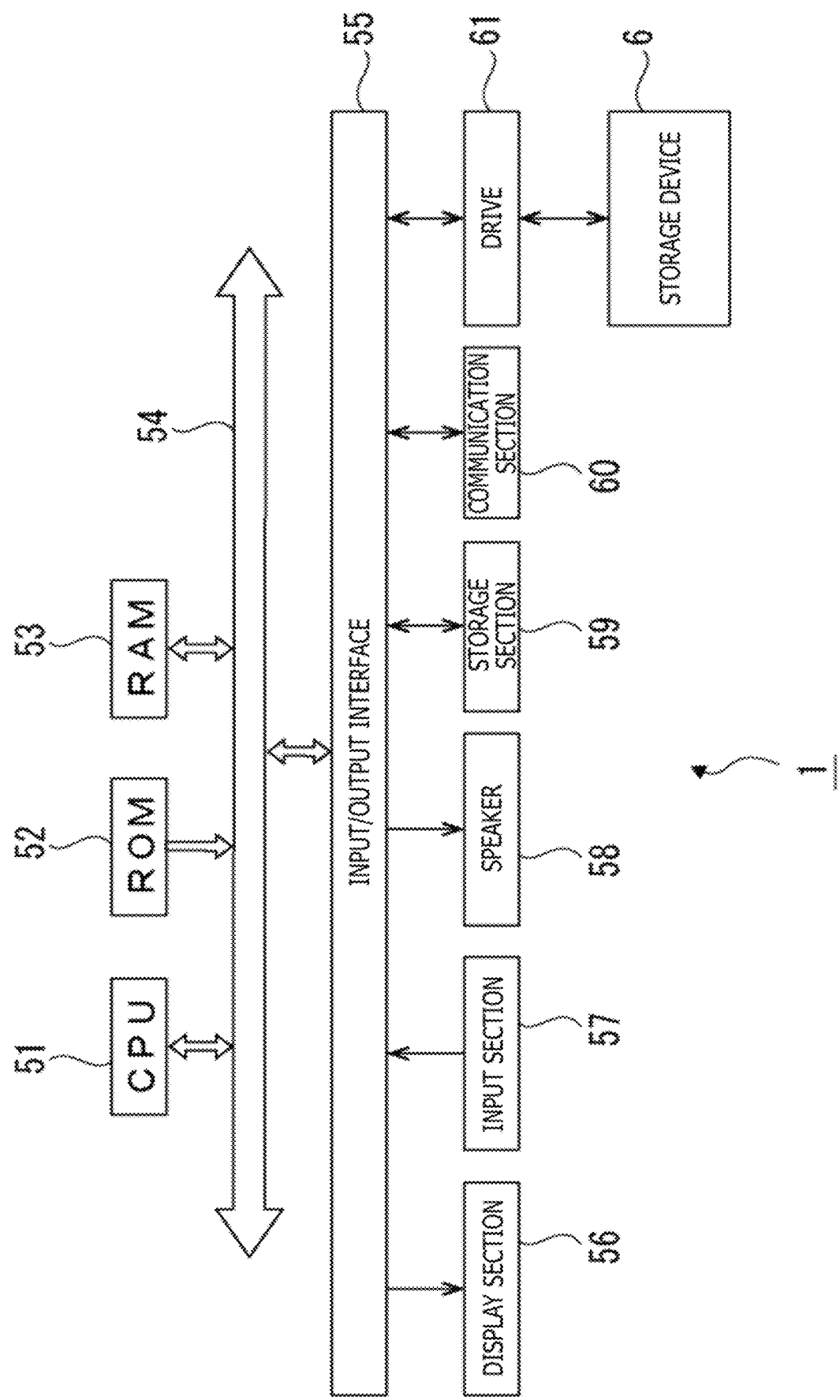
FIG. 7 is a block diagram of a hardware configuration of an information processing apparatus according to the embodiment.

FIG. 7 illustrates a hardware configuration of the information processing apparatus 1. The information processing apparatus 1 includes a CPU (Central Processing Unit) 51, a ROM (Read Only Memory) 52, and a RAM (Random Access Memory) 53.

The CPU 51 executes various types of processing in accordance with programs stored in the ROM 52 or programs loaded from the storage section 59 into the RAM 53.

The RAM 53 also appropriately stores data for the CPU 51 to execute various types of processing, or the like.

The CPU 51, the ROM 52, and the RAM 53 are connected together via a bus 54. An input/output interface 55 is also connected to the bus 54.

The input/output interface 55 can be connected to a display section 56 including a liquid crystal panel, an organic EL (Electroluminescence) panel, or the like, an input section 57 including a keyboard, a mouse, or the like, a speaker 58, a storage section 59, a communication section 60, and the like.

The display section 56 may be integrated with the information processing apparatus 1 or may be equipment separated from the information processing apparatus 1.

The display section 56 displays various analysis results and the like on a display screen on the basis of instructions from the CPU 51. Additionally, on the basis of instructions from the CPU 51, the display section 56 displays various operation menus, icons, messages, and the like, that is, operates as a GUI (Graphical User Interface) to provide display.

The input section 57 means an input device used by the user utilizing the information processing apparatus 1.

For example, the input section 57 is assumed to be any of various operators and operation devices such as a keyboard, a mouse, keys, dials, a touch panel, a touchpad, or a remote controller.

The input section 57 detects an operation of the user, and a signal corresponding to the input operation is interpreted by the CPU 51.

The storage section 59 includes a storage medium, for example, an HDD (Hard Disk Drive), a solid-state memory, or the like. The storage section 59 stores, for example, the detection data and analysis results received from the macro measurement section 2 and the micro measurement section 3 and various other types of information. Additionally, the storage section 59 is used to store program data for analysis processing and the like.

The communication section 60 performs communication processing via a network including the Internet and communicates with equipment in peripheral portions.

The communication section 60 may be, for example, a communication device communicating with the micro measurement section 3 (imaging apparatus 250) and the macro measurement section 2 (imaging apparatus 220).

A drive 61 is also connected to the input/output interface 55 as necessary, and a storage device 6 such as a memory card is installed in the input/output interface 55 as necessary to allow data to be written to and read from the storage device 6.

For example, a computer program read from the storage device 6 is installed in the storage section 59, and data processed by the CPU 51 is stored in the storage section, as necessary. Needless to say, the drive 61 may be a recording and reproducing drive for a removable storage medium such as a magnetic disk, an optical disc, or a magneto-optical disc. The magnetic disk, the optical disc, the magneto-optical disc, or the like is also a mode of the storage device 6.

Note that the information processing apparatus 1 according to the embodiment is not limited to the unitary information processing apparatus (computer apparatus) 1 with a hardware configuration as illustrated in FIG. 7 and that a plurality of computer apparatuses may be configured into a system. The plurality of computer apparatuses may be configured into a system using a LAN or the like or arranged at remote positions via a VPN (Virtual Private Network) or the like utilizing the Internet or the like. The plurality of computer apparatuses may include a computer apparatus available through a cloud computing service.

Additionally, the information processing apparatus 1 in FIG. 7 can be implemented as a personal computer such as a desk top type or a notebook type, or a portable terminal such as a tablet terminal or a smartphone. Furthermore, electronic equipment such as a measurement apparatus, a television apparatus, a monitor apparatus, an imaging apparatus, or a facility management apparatus which functions as the information processing apparatus 1 can be equipped with the information processing apparatus 1 according to the present embodiment.

For example, the information processing apparatus 1 with such a hardware configuration includes the calculation function of the CPU 51, the storage function of the ROM 52, RAM 53, and storage section 59, the data acquisition function of the communication section 60 and the drive 61, and the output function of the display section 56 and the like. Installed software functions to provide a functional configuration as illustrated in FIG. 8.

Figure 8:
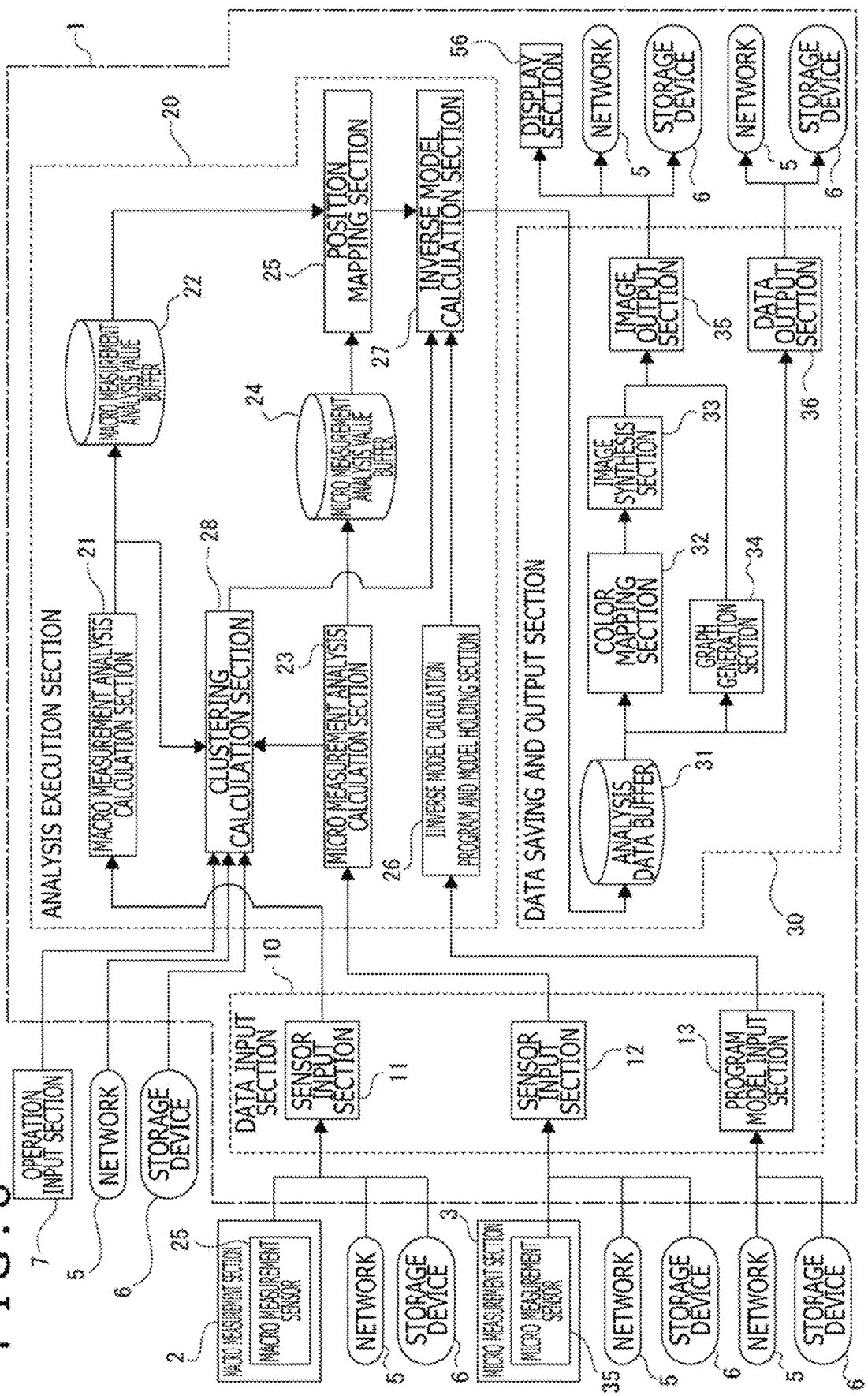
FIG. 8 is a block diagram of a functional configuration of the information processing apparatus according to the embodiment.

That is, the information processing apparatus 1 is provided, as major sections, with a data input section 10, an analysis execution section 20, and a data saving and output section 30 illustrated in FIG. 8.

These processing functions are implemented by software initiated by the CPU 51.

A program included in the software is downloaded from the network or read from the storage device 6 (for example, a removable storage medium), and installed in the information processing apparatus 1 in FIG. 7. Alternatively, the program may be prestored in the storage section 59 or the like. Then, the CPU 51 initiates the program to activate the function of each section as described above.

Additionally, the storage function of various buffers and the like is implemented using, for example, a storage area in the RAM 53 or a storage area in the storage section 59.

Additionally, FIG. 8 illustrates, as external apparatuses of the information processing apparatus 1, the macro measurement section 2, the micro measurement section 3, a network 5, the storage device 6, and the operation input section 7.

The macro measurement section 2 is mounted, for example, in the artificial satellite 210 as described above. A macro measurement sensor 2S is a large sensor such as a hyper spectrum camera or an FTIR, and can be mounted in the artificial satellite 210 but is difficult to mount in the flying body 200. These sensors generally operate outside a visible light spectrum and are mainly used to measure physical properties.

The micro measurement section 3 is mounted in the flying body 200. A micro measurement sensor 3S is a small sensor such as an RGB camera or a stereo camera and is easy to mount in the flying body 200. In general, the micro measurement sensor 3S operates in the visible light spectrum and is mainly used to measure the character and environmental response of the measurement target.

The network 5 is assumed to be, for example, the Internet, a home network, a LAN (Local Area Network), a satellite communication network, or any of various other networks.

The storage device 6 is mainly assumed to be a removable storage medium such as a memory card or a disk-like recording medium as described above.

The operation input section 7 is a device by which the user can provide manual input and can be considered to be the input section 57 in FIG. 7.

The operation input section 7 may be integrated with the information processing apparatus 1 or may be an apparatus separated from the information processing apparatus 1.

The data input section 10 in the information processing apparatus 1 corresponds to a function to accept data input from the external apparatus described above, and includes sensor input sections 11 and 12 and a program and model input section 13.

The sensor input section 11 inputs detection information from the macro measurement sensor 2S of the macro measurement section 2. The detection data from the macro measurement sensor 2S may be directly received, for example, by communication between the macro measurement section 2 and the communication section 60 in FIG. 7.

Alternatively, the detection data from the macro measurement sensor 2S may be received by the communication section 60 via the network 5.

Furthermore, the detection data from the macro measurement sensor 2S may be acquired via the storage device 6.

The sensor input section 12 inputs detection information from the micro measurement sensor 3S of the micro measurement section 3. The detection data from the micro measurement sensor 3S may be directly received, for example, by communication between the micro measurement section 3 and the communication section 60, received by the communication section 60 via the network 5, acquired via the storage device 6, or the like.

Note that processing such as spectral correction of the light source may be preceded in the sensor input sections 11 and 12.

The program and model input section 13 acquires a suitable program or model by downloading the program or model from a server via the network 5 or reading the program or model from the storage device 6. The model refers to model parameters used for the inverse calculation.

The analysis execution section 20 includes a macro measurement analysis calculation section 21, a macro measurement analysis value buffer 22, a micro measurement analysis calculation section 23, a micro measurement analysis value buffer 24, a position mapping section 25, an inverse model calculation program and model holding section 26 (hereinafter referred to as the "holding section 26"), an inverse model calculation section 27, and a clustering calculation section 28.

The macro measurement analysis calculation section 21 performs a calculation for determining the amount of a substance component and the like from the detection data from the macro measurement sensor 2S acquired by the sensor input section 11.

For example, the macro measurement analysis calculation section 21 calculates, from multi-wavelength data from a hyper spectrum camera or an FTIR, a vegetation index and an SIF (chlorophyll fluorescence) based on an NIRS (near infrared spectroscopy) and an FLD method (Fraunhofer. Line-Discrimination) method (sun dark lines: Fraunhofer lines), or the like.

Note that the sun dark lines $O_2A$ have a wavelength width of approximately 1 nm and are thin, and that sensing is thus typically suitable that uses a sensor such as a hyper spectrum camera or an FTIR. In the sensing system in the present example, since such equipment is easy to mount in the artificial satellite 210, the macro measurement analysis calculation section 21 performs the calculation on the basis of the detection data from the macro measurement section 2.

The macro measurement analysis value buffer 22 temporarily holds data processed by the macro measurement analysis calculation section 21.

For example, the macro measurement analysis value buffer 22 holds the SIF calculated by the macro measurement analysis calculation section 21, position information notified from the macro measurement section 2, and the like.

The micro measurement analysis calculation section 23 performs a calculation for obtaining suitable information from the detection data from the micro measurement sensor 3S acquired by the sensor input section 12.

For example, the micro measurement analysis calculation section 23 calculates the LAI, the average leaf angle, the sun leaf ratio, and the like. The sun leaf refers to a leaf or a portion of the leaf exposed to sunlight.

The micro measurement analysis value buffer 24 temporarily holds data processed by the micro measurement analysis calculation section 23.

For example, the micro measurement analysis value buffer 24 holds information regarding the LAI, the average leaf angle, the sun leaf ratio, and the like determined by the micro measurement analysis calculation section 23, and position information notified from the micro measurement section 3, and further holds RGB images, NDVI images, and the like.

The position mapping section 25 performs a calculation for extracting the same point from a group of images with different resolutions or imaging units (measurement ranges RZ2 and RZ3). For example, GPS information or orthomosaic processing is used to align information processed by the macro measurement analysis calculation section 21 with information processed by the micro measurement analysis calculation section 23.

The inverse model calculation section 27 is a function to perform the inverse model calculation using calculation results from the macro measurement analysis calculation section 21 and the micro measurement analysis calculation section 23.

That is, the inverse model calculation section 27 generates model parameters based on the detection data from the micro measurement section 3 determined by the micro measurement analysis calculation section 23.

The inverse model calculation section 27 then uses the model parameters as parameters for the inverse model to perform the inverse model calculation using the calculation result from the macro measurement analysis calculation section 21.

Note that, after generating the model parameters based on the detection data from the micro measurement section 3, the inverse model calculation section 27 may associate the model parameters with information regarding the date, the time, and the location and cause the resultant information to be saved in a predetermined storage section. The date, the time, and the location refer to the date, the time, and the location (for example, GPS information) when and where the original micro measurement for determining the model parameters has been performed.

The holding section 26 holds inverse model calculation program and model default parameters acquired by the program and model input section 13. The inverse model calculation section 27 performs the inverse model calculation on the basis of these program and model.

The clustering calculation section 28 performs a clustering calculation. For example, the clustering calculation section 28 performs clustering corresponding to division, into areas, of the farm field 300 or the like to be measured, on the basis of user input by the operation input section 7. The user specifies, for example, boundaries in the field across which different crops or the same crops at different developing stages are planted. This allows the user to perform optional cluster division.

Additionally, the clustering calculation section 28 may acquire, via the network 5 or via the storage device 6, information regarding an instruction for the clustering.

Furthermore, the clustering calculation section 28 may perform automatic clustering on the basis of information obtained from the micro measurement analysis calculation section 23 or information obtained from the macro measurement analysis calculation section 21.

The information obtained from the micro measurement analysis calculation section 23 and used for the clustering may be the detection data from the micro measurement section 3, or the LAI, the average leaf angle, the sun leaf ratio, and the like calculated from the detection data by the micro measurement analysis calculation section 23.

The information obtained from the macro measurement analysis calculation section 21 and used for the clustering may be the detection data from the macro measurement section 2 (multi spectrum spectral information and the like), or the SIF and the like calculated from the detection data by the macro measurement analysis calculation section 21.

The cluster division can be performed on the basis of the discrepancy between the above-described different types of information. Furthermore, analysis, machine learning, or the like of image texture is assumed to be performed.

Additionally, in a case where there is any difference in a physiological character or an environmental response as well as in a form or a character, the difference may be used for the clustering.

Additionally, in a combination of manual input and automatic cluster determination, in a case where the user specifies areas and one area specified by the user includes a plurality of clusters automatically discriminated by the macro measurement section, automatically subdivided clusters may be set.

Cluster information from the clustering calculation section 28 is provided to the inverse model calculation section 27 and referenced during the inverse model calculation.

The data saving and output section 30 includes an analysis data buffer 31, a color mapping section 32, an image synthesis section 33, a graph generation section 34, an image output section 35, and a data output section 36.

Information regarding the calculation result from the inverse model calculation section 27 is temporarily saved in the analysis data buffer 31.

In a case where the inverse model calculation section 27 determines, for example, the SIF, the analysis data buffer 31 holds the information. Additionally, the analysis data buffer 31 may hold RGB images or NDVI images.

To visualize and display physical values obtained as the calculation result from the inverse model calculation section 27, the color mapping section 32 executes calculation processing of using, for example, each level of RGB primary colors to convert a certain range of physical values into a color gradation from blue to red.

The image synthesis section 33 executes calculation processing of pasting color-mapped physical value data to an original spatial region or overlaying the color-mapped physical value data on an RGB image.

To visualize and display data, the graph generation section 34 executes calculation processing of creating a graph, for example, representing physical values in broken lines or converting two-dimensional physical values into a scatter diagram.

The image output section 35 outputs image data generated by processing of the color mapping section 32, the image synthesis section 33, and the graph generation section 34 to the external display section 56 for display. Alternatively, the image output section 35 performs output for transmitting the generated image data to an external apparatus using the network 5, or filing the image data and saving the resultant file in the storage device 6.

The data output section 36 outputs information regarding the calculation result from the inverse model calculation section 27 saved in the analysis data buffer 31. For example, the data output section 36 performs output for transmitting the information regarding the inverse model calculation result to an external apparatus using the network 5, or filing the information regarding the inverse model calculation result and saving the resultant file in the storage device 6.

3. PROCESSING EXAMPLE

An example of processing of the information processing apparatus 1 including the functions described above will be described.

Figure 9:
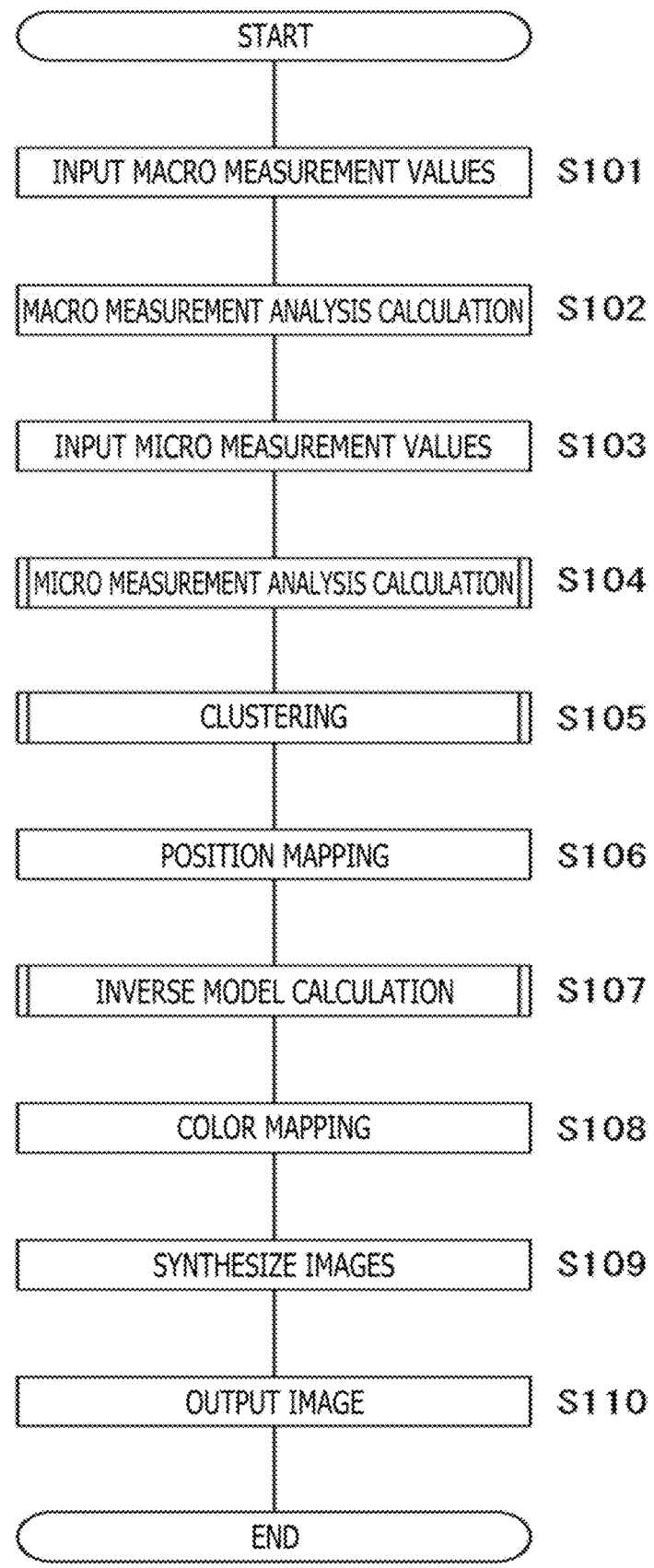
FIG. 9 is a flowchart of a processing example according to the embodiment.

FIG. 9 illustrates an example of processing of the information processing apparatus 1.

In step S101, the information processing apparatus 1 inputs measurement values from the macro measurement section 2 using the function of the sensor input section 11.

In step S102, the information processing apparatus 1 performs a macro measurement analysis calculation using the function of the macro measurement analysis calculation section 21. For example, for information regarding photosynthesis, an SIF calculation is performed. For the SIF calculation, the FLD method based on dark lines in a solar spectrum is known.

In step S103, the information processing apparatus 1 inputs measurement values from the micro measurement section 3 using the function of the sensor input section 12.

In step S104, the information processing apparatus 1 performs a micro measurement analysis calculation using the function of the micro measurement analysis calculation section 23.

Figure 10:
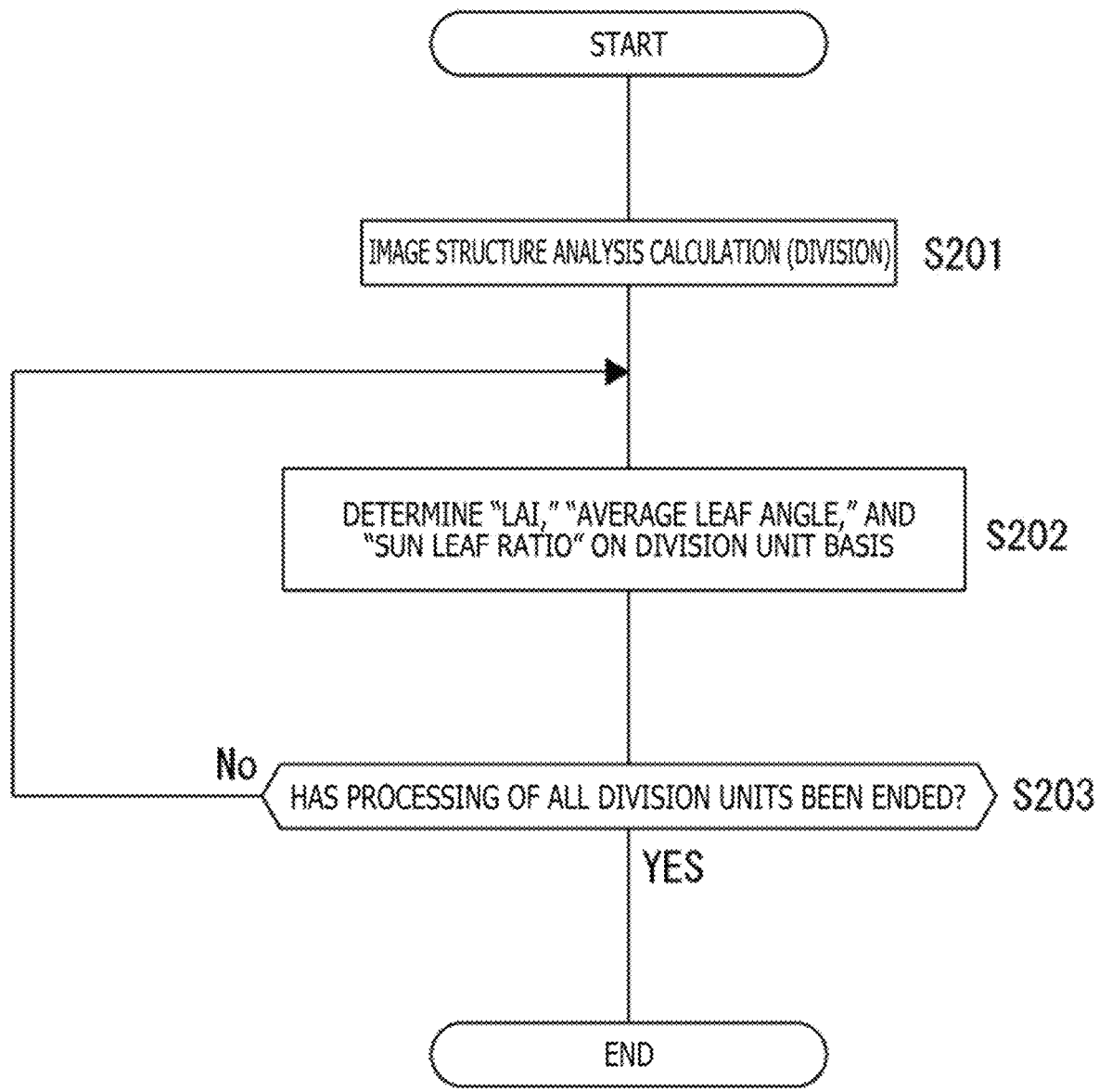
FIG. 10 is a flowchart of micro measurement analysis calculation processing according to the embodiment.

FIG. 10 illustrates an example of processing in the micro measurement analysis calculation in step S104.

Figure 11:
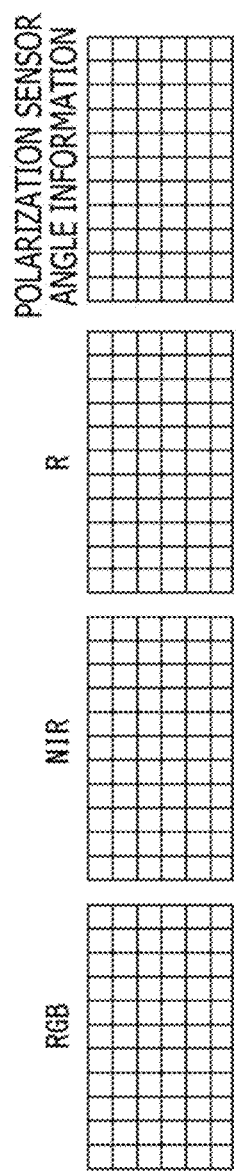
FIG. 11 is a descriptive diagram of images used for a micro measurement analysis calculation according to the embodiment.

Note that the micro measurement analysis calculation section 23 is assumed to have acquired an RGB image, an NIR image, an R image, and polarization sensor angle information illustrated in FIG. 11.

In step S201 in FIG. 10, the micro measurement analysis calculation section 23 performs an image structure analysis calculation. Specifically, the image is divided. In a simple case, the image may be divided into cells as illustrated in FIG. 11.

However, the image may be divided by using image recognition or the like to make discriminations according to objects and the like. For example, individuals as measurement targets are identified and the image is divided according to the identified individuals.

In step S202, the micro measurement analysis calculation section 23 calculates the LAI, the average leaf angle, and the sun leaf ratio on a division unit basis.

The LAI can be determined from a plant coverage. The plant coverage can be determined by dividing the number of pixels corresponding to an NDVI of a certain value or larger, by the number of measurement points (the number of pixels) in the relevant division unit.

Note that the NDVI can be determined from the R image and the NIR image. That is, the value of the NDVI is determined by:

$$NDVI = (NIR - R)/(NIR + R)$$

where "R" is a reflectance of a visible region red, and "NIR" is a reflectance in a near infrared region. The NDVI has a numerical value normalized within a range of "−1" to "1," and larger positive values of the NDVI indicate denser vegetation.

The leaf angle can be determined by acquiring angle information from a polarization sensor.

The sun leaf ratio is the ratio of leaves exposed to sunlight. Sun leaves can be extracted as pixels having an NDVI of a certain value or larger and an NIR of a certain value or a larger. Accordingly, the sun leaf ratio can be determined by dividing the number of thus extracted pixels by the number of measurement points (the number of pixels) in the relevant division unit.

In step S203, the micro measurement analysis calculation section 23 determines whether or not the calculation of the LAI, the average leaf angle, and the sun leaf ratio is completed for all the division units. In a case where the calculation is not completed, then in step S202, the LAI, the average leaf angle, and the sun leaf ratio are calculated for the next division unit.

Once the processing is finished for all the division units, the micro measurement analysis calculation is ended.

In the above-described processing in FIG. 10, execution of step S104 in FIG. 9 causes the information processing apparatus 1 to perform, in step S105, the clustering using the function of the clustering calculation section 28.

FIG. 12 illustrates an example of a clustering calculation.

In step S301, the clustering calculation section 28 specifies, for the measurement target, divisions manually input by the user.

Figure 13A:
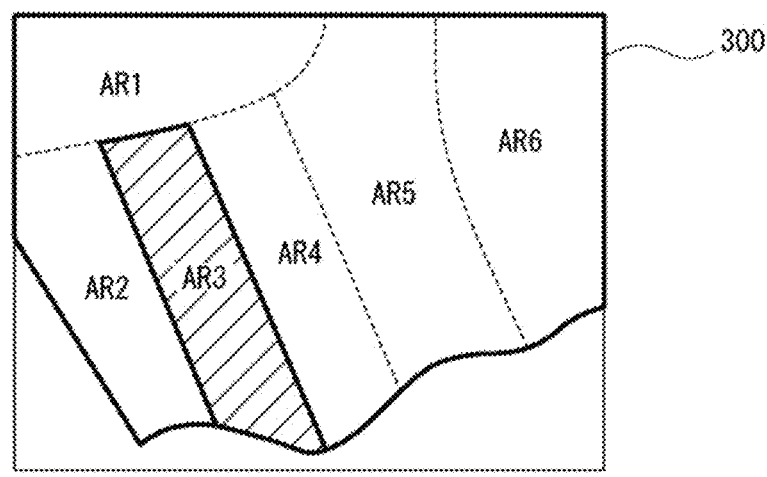
FIGS. 13A, 13B, and 13C illustrate diagrams of the clustering according to the embodiment.

FIG. 13A schematically illustrates the farm field 300 corresponding to the measurement target. Note that areas AR1 to AR6 are defined for convenience of description and do not necessarily correspond to areas of different types of vegetation. However, the hatched area AR3 is assumed to be an area where crops different from the crops in the other areas are cultivated.

In this case, the user specifies, by manual input, boundaries illustrated by thick lines. For example, it is assumed that the entire area in the farm field where plants are cultivated is indicated (boundaries of the field) and that boundaries are specified that distinguish the area AR3 where a different type of crops are cultivated.

The clustering calculation section 28 performs the cluster division as indicated by the thick lines, reflecting input based on such information preliminarily known by the user.

In step S302, the clustering calculation section 28 performs automatic clustering using information obtained from the macro measurement analysis calculation section 21 and using information obtained from the micro measurement analysis calculation section 23. The clustering is performed using, for example, the SIF amount, the LAI, the average leaf angle, the sun leaf ratio, or the like.

Figure 13B:
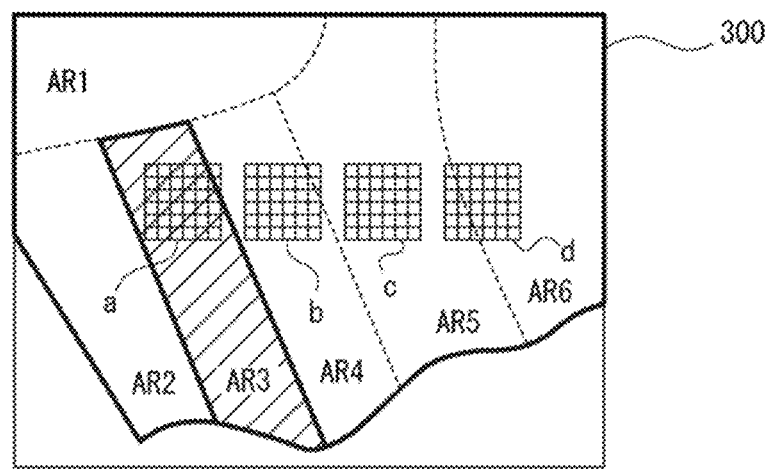

FIG. 13B illustrates measurement ranges a, b, c, and d as the micro measurement ranges RZ3 related to a plurality of measurements. In this case, the measurement range a corresponds to the micro measurement range RZ3 for the measurement of an area AR3, the measurement range b corresponds to the micro measurement range RZ3 for the measurement of an area AR4, the measurement range c corresponds to the micro measurement range RZ3 for the measurement of an area AR5, and the measurement range d corresponds to the micro measurement range RZ3 for the measurement of an area AR6.

The automatic clustering is assumed to involve executing, for example, processing of dividing the areas into clusters with different LAIs. It is assumed the value of the LAI varies between the measurement ranges a, b, and c but is substantially the same between the measurement ranges c and d.

The area AR3 differs from the area AR4 in crops and the LAI. It is assumed that the areas AR4, AR5, and AR6 are the same in crops but that only the area AR4 involves a different growth situation. Then, setting the area AR4 as a separate cluster is appropriate.

In step S303, the clustering calculation section 28 subdivides the cluster setting based on the user input such that the subdivision reflects automatic cluster determination in step S304.

Figure 13C:
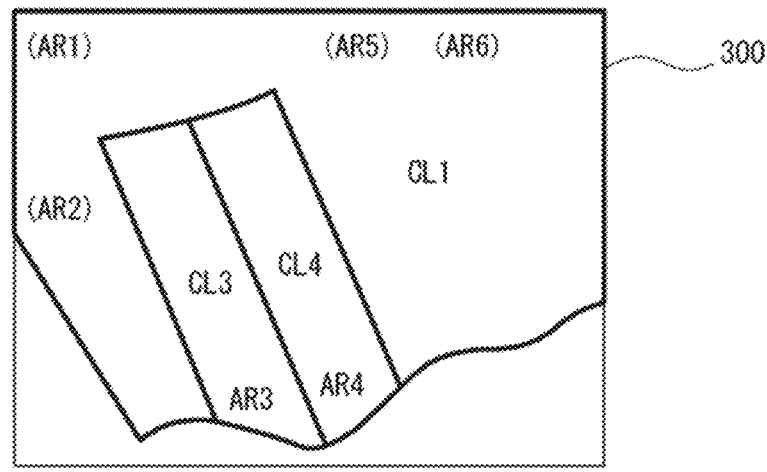

In the above-described example, as illustrated by thick lines in FIG. 13C, the area AR4 is newly set as one cluster.

For example, the area AR3 and the area AR4 are respectively assumed to be a cluster CL3 and a cluster CL4. Note that the areas AR1 and AR2 have not been referred to but that, in a case where the areas AR1 and AR2 have the same LAI as that of the areas AR5 and AR6, the areas AR1, AR2, AR5, and AR6 are collectively designated as one cluster CL1.

For example, as described above, the clustering calculation is performed by executing the clustering in accordance with the user input and executing, for subdivision, the automatic cluster determination using the values related to the macro measurement or micro measurement.

Needless to say, the clusters may be set exclusively in accordance with the user input or by executing, for subdivision, the automatic cluster determination using the values related to the macro measurement or micro measurement.

After performing the clustering calculation described above, the information processing apparatus 1 performs, in step S106 in FIG. 9, position mapping using the function of the position mapping section 25.

That is, the information processing apparatus 1 aligns the macro measurement analysis calculation result with the micro measurement analysis calculation result.

Figure 14:
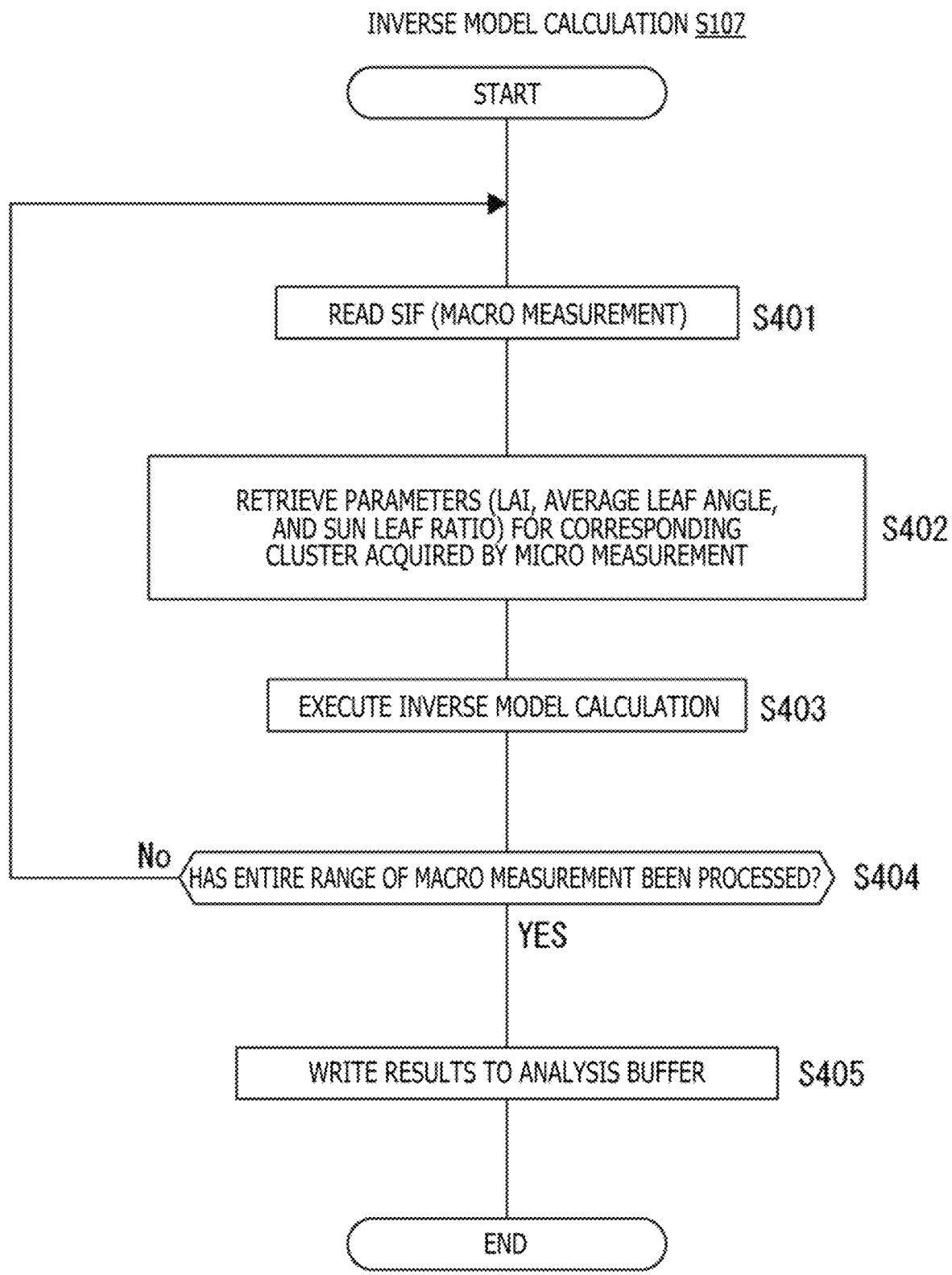
FIG. 14 is a flowchart of an inverse model calculation according to the embodiment.

In step S107, the information processing apparatus 1 performs the inverse model calculation using the function of the inverse model calculation section 27. FIG. 14 illustrates an example of processing of the inverse model calculation.

Figures 15A, 15B:
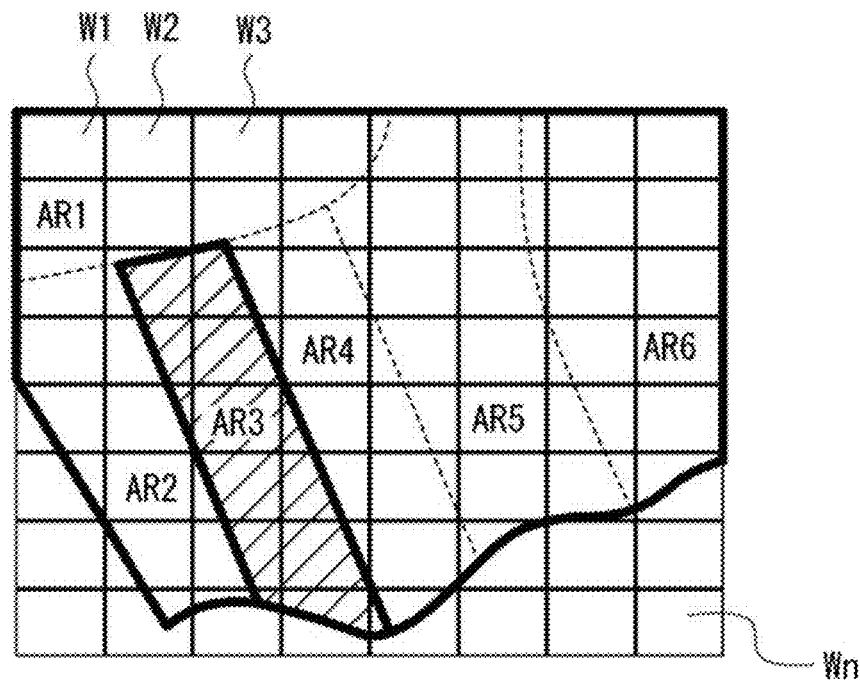
FIGS. 15A and 15B illustrate diagrams of macro measurement and micro measurement section model parameters for the inverse model calculation according to the embodiment.

Note that FIG. 15A schematically illustrates the areas of the SIF calculation based on the macro measurement. The SIF is determined in units of cells each illustrated as the macro measurement resolution (macro resolution units W1 to Wn).

In step S401, the inverse model calculation section 27 reads, for one macro resolution unit, the SIF calculated by the macro measurement analysis calculation section 21. For example, the inverse model calculation section 27 first reads the SIF of the macro resolution unit W1.

In step S402, the inverse model calculation section 27 acquires, for the cluster corresponding to the macro resolution unit, the parameters determined by the micro measurement analysis calculation section 23, that is, the LAI, the average leaf angle, and the sun leaf ratio.

FIG. 15B illustrates the LAI, the average leaf angle, and the sun leaf ratio for the above-described measurement ranges a, b, and c (=d). In other words, the LAI, the average leaf angle, and the sun leaf ratio are the model parameters for the cluster CL3 for the area AR3, the cluster CL4 for the area AR4, and the cluster CL1 for the areas AR1+AR2+AR5+A6 as illustrated in FIG. 13C.

For example, the macro resolution unit W1 corresponds to the cluster CL1, and thus the model parameters for the cluster CL1 in FIG. 15B are acquired.

In step S403, the inverse model calculation section 27 performs the inverse model calculation. That is, a desired physical property value (for example, the character of the measurement target) is determined from the SIF obtained on the basis of the macro measurement.

In this case, as the model parameters, the parameters based on the micro measurement acquired in step S402 are used.

Thus, even in a case where the shape or state of the measurement target is not known simply by the sensing performed by the macro measurement section 2, the correct SIF can be determined according to the shape and state of the actual measurement target.

The above-described processing is repeated by returning from step S404 to step S401 until the processing is executed on all of the macro resolution units W1 to Wn. In other words, from the macro resolution unit W1 to the macro resolution unit Wn, the inverse model calculation is performed using the model parameters based on the micro measurement for the corresponding cluster.

Note that the example of the SIF has been described but that, for example, in a case where the NDVI is obtained on the basis of the macro measurement, the desired physical property value (for example, the chlorophyll concentration as the environmental response) can be determined by the inverse calculation from the NDVI based on the macro measurement.

Once the process is finished for all of the macro resolution units, the inverse model calculation section 27 proceeds to step S405 to write the calculation result into the analysis data buffer 31. In this case, the calculation result is written for each of the macro resolution units W1 to Wn.

Note that, in the above-described processing, the model parameters for the cluster corresponding to each macro resolution unit are applied to the macro resolution unit, but that the clustering may not particularly be performed. For example, in a case where the same plants are planted in a similar growing condition throughout the farm field 300, the clustering in step S105 may not result in cluster division. Additionally, an example of processing is assumed in which the processing in step S105 is not executed.

In those cases, it is sufficient to perform the inverse model calculation by applying, to all of the macro resolution units, the model parameters obtained by measuring the single micro measurement range RZ3.

In the above-described processing, after executing step S107 in FIG. 9, the information processing apparatus 1 uses the function of the data saving and output section 30 to perform color mapping in step S108, image synthesis in step S109, and image output in step S110.

Thus, the user can check the calculation result using the display section 56 or the like.

An example of an output image subjected to color mapping or the like in this case will be described.

Figures 16A, 16B:
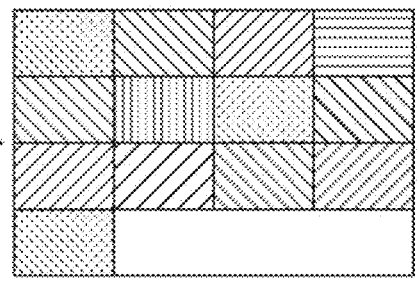
FIGS. 16A and 16B illustrate diagrams of an output image obtained using color mapping according to the embodiment.

FIGS. 16A and 16B are examples in which an image is generated by performing color allocation (color mapping) on the inverse model calculation result for each macro resolution unit obtained as described above. "Color allocation" as used herein refers to presetting a color corresponding to each range of numeral values, selecting a color according to the value of a target, and allocating the color to the relevant pixel.

FIG. 16A illustrates the inverse model calculation result for each macro resolution unit. Colors are allocated to these values to generate a color mapping image as illustrated in FIG. 16B. In the image, the color corresponding to the value of the calculation result is allocated to each area.

Note that the drawings represent differences in color on the basis of the type of hatched lines, dotting, and the like. Additionally, "NO DATA" is indicated for macro resolution units for which no effective calculation result is present (for example, portions in which no sun leaf is present, or the like). For example, a background color (white) is allocated to areas for which "NO DATA" is indicated.

In a case where such a color mapping image is presented to the user, the inverse model calculation result for the area in each macro resolution unit is expressed in color, and the image allows the user to easily recognize the macro measurement result.

Next, FIGS. 17A, 17B, and 17C are examples in which images with colors allocated to areas where the vegetation is in specific states are synthesized. FIG. 17A illustrates the value of the inverse model calculation result for each macro resolution unit. FIG. 17B is an image NDVIp-pr (NDVI Plants Filtered Par Filtered) depicting extracted sun leaves. The image NDVIp-pr depicting extracted sun leaves refers to an image depicting an extracted range having an NDVI of a certain value or larger and an NIR of a certain value or larger.

Then, colors are allocated to the sun leaf portions in each macro resolution unit to generate a color mapping image as illustrated in FIG. 17C. Only the sun leaf portions have colors according to the inverse model calculation result. Thus, the image allows the user to easily recognize the macro measurement result along with the distribution of sun leaves in each area.

Next, FIGS. 18A, 18B, and 18C are examples of overlay display on a visible light image (RGB image).

FIG. 18A illustrates the value of the inverse model calculation result for each macro resolution unit. FIG. 18B is an RGB image.

As illustrated in FIG. 18C, in the RGB image, the color allocated to each macro resolution unit according to the value of the inverse model calculation result is overlaid. The drawing illustrates that colors are applied to relevant pixel portions.

In other words, in the image, the colors indicating the calculation results are expressed on the RGB image. Thus, the macro measurement results are easily recognized on the image normally viewed by the user.

Note that, instead of the overlaying, overwriting with the color allocated to the relevant pixel may be performed.

For example, an output image is generated as described above and illustrated in FIGS. 16A, 16B, 17A, 17B, 17C, 18A, 18B, and 18C, and is displayed on the display section 56, transmitted to an external apparatus using the network 5, or filed with the resultant file saved in the storage device 6. Then the user can utilize the analysis results.

For example, an output image is generated as described above and illustrated in FIG. 16, FIG. 17, and FIG. 18, and is displayed on the display section 56, transmitted to an external apparatus using the network 5, or filed with the resultant file saved in the storage device 6. Then the user can utilize the analysis results.

4. VARIOUS EXAMPLES

The above description assumes vegetation sensing. However, the technique according to the present disclosure is applicable to various fields.

For example, in a case where a central heat source is used in a building such as an office building, the amount of energy usage of the whole building can be recognized by the macro measurement.

Additionally, certain measurement can be performed on a part of the building (for example, a business office occupying a certain floor) as micro measurement.

In a case where the inverse model calculation is performed using information based on the macro measurement, the model parameters may be set on the basis of the micro measurement.

Additionally, for example, in the fields of labor statistics and the like, the transition of an unemployment rate for a certain period can be measured as the macro measurement, and the attributes of unemployed people in each season and the like can be measured as the micro measurement.

In a case where the inverse model calculation is performed using information based on the macro measurement, the model parameters may be set on the basis of the micro measurement.

5. CONCLUSION AND MODIFIED EXAMPLES

The embodiment described above produces the following effects.

The information processing apparatus 1 according to the embodiment includes the macro measurement analysis calculation section 21 calculating the detection data from the macro measurement section 2 performing sensing at a macro measurement resolution (first spatial resolution) for the macro measurement range RZ2 (first measurement range) for the measurement target. The information processing apparatus 1 also includes the micro measurement analysis calculation section 23 calculating the detection data from the micro measurement section 3 performing sensing at a micro measurement resolution (second spatial resolution) for the micro measurement range RZ3 (second measurement range), the micro measurement resolution being higher than before the macro measurement resolution, the micro measurement range RZ3 being included in the macro measurement range RZ2. Furthermore, the information processing apparatus 1 includes the inverse model calculation section 27 acquiring the model parameters used for the inverse model calculation using the calculation result from the macro measurement analysis calculation section 21, on the basis of the detection data from the micro measurement section 3 determined by the micro measurement analysis calculation section 23.

By calculating the model parameters based on the micro measurement as described above, the parameters for the inverse model can be obtained that are suitable for the inverse model calculation using the calculation result from the macro measurement analysis calculation section.

Additionally, in the embodiment, the inverse model calculation section 27 uses the model parameters based on the detection data from the micro measurement section 3 determined by the micro measurement analysis calculation section 23, as the parameters for the inverse model in the inverse model calculation using the calculation result from the macro measurement analysis calculation section 21.

In a case where the inverse model calculation is performed, and in a case where the shape or state varies, or the like, the shape or state of the measurement target may be different from the standard shape or state indicated by the model, leading to reduced measurement accuracy. In the present embodiment, the inverse model parameters are generated on the basis of actual measurement based on the micro measurement. Thus, accurate measurement can be achieved even in a case where the shape or state varies or where the measurement target does not have the standard shape indicated by the model.

In particular, in this case, by using the detection data from the micro measurement section 3, which can perform sensing at a high spatial resolution, the inverse model parameters can be made more appropriate. This enables measurement based on the inverse model calculation corresponding to the character and environmental response of the measurement target, which has not been enabled simply by the macro measurement section 2.

More specifically, in high-resolution measurement using the flying body 200, the state of plants in the actual field (plant coverage and height, average angle of leaves, chlorophyll concentration, and the like) or the setting status of ridges is measured, and parameters for a real object are used for the inverse model calculation based on the sensing of the artificial satellite 210. Then, accurate measurement can be achieved even in a case where the shape or state varies or where the measurement target does not have the standard shape indicated by the model.

Additionally, the use of such a measurement system, for example, allows the flying body 200 to obtain photosynthesis information without measurement of the SIF. Advantageously, the artificial satellite 210 can also achieve acquisition of high-resolution information, which has heretofore not been expected.

In the embodiment, the inverse model calculation section 27 uses the model parameters based on the detection data for the micro measurement range RZ3 (second measurement range) to determine the calculation result in units of the macro measurement resolution (first spatial resolution) (see FIGS. 14, 15A, and 15B).

Thus, using the inverse model calculation, measurement values reflecting the micro measurement can be determined within the macro measurement range RZ2 in units of the macro measurement resolution.

In particular, images from the artificial satellite 210 are included in an output range, and thus, an inverse model calculation result is obtained as an image covering a range wider than the range covered by the flying body 200.

In the embodiment, the inverse model calculation section 27 determines the character or environmental response of the measurement target as the calculation result in units of the macro measurement resolution.

This realizes sensing that determines the static shape or characteristics of the measurement target or the dynamic shape or characteristics of the measurement target.

For example, by obtaining the shape of plants, the vegetation index, information regarding photosynthesis, or the like, remote sensing suitable for agriculture is realized.

For example, as the information regarding photosynthesis, the correct SIF (solar-induced chlorophyll fluorescence) and various types of information calculated from the correct SIF can be obtained even in a case where the shape or state of the measurement target is unknown.

In the embodiment, the macro measurement section 2 performs sensing at a longer distance from the measurement target 4 (for example, the farm field 300) than the micro measurement section 3.

In a situation in which the macro measurement section 2 is located relatively away from the measurement target 4, a relatively large-scale apparatus or device is easily implemented as the macro measurement section 2 or an apparatus equipped with the macro measurement section 2.

Note that the micro measurement section 3 is mounted in the flying body 200, whereas the macro measurement section 2 is mounted in the artificial satellite 210, but that the macro measurement section 2 may be mounted in the flying body 200 such as a drone. For example, the macro measurement section 2 may be mounted in the flying body 200 flying higher in the sky to sense the macro measurement range RZ2.

In the example referred to in the embodiment, the inverse model calculation section 27 acquires the model parameters for the representative individual for each of the measurement areas resulting from the clustering, switches the model parameters for each of the measurement areas resulting from the clustering, and applies the resultant model parameters to the inverse model (see FIGS. 14, 15A, and 15B).

By calculating the detection data from the micro measurement section to determine the model parameters for each of the measurement areas resulting from the clustering, the inverse model calculation section 27 can use different model parameters for the respective measurement areas resulting from the clustering.

Thus, even within the macro measurement range RZ2, appropriate different measurement results can be obtained for the respective clustered areas, for example, for the respective areas where different crops are cultivated.

Note that the, by specifying the name of crops for each cluster, not only the model parameters (for example, height) but also the model itself (model reflecting a difference in shape between breeds, for example, tomato and corn) may be switched automatically.

In the example referred to in the embodiment, the clustering is based on the user input specifying the areas.

In the farm field 300 and the like, for example, different crops are cultivated in the respective areas. For example, the user such as a farmer can input such information.

This allows clear acquisition of information regarding the areas where different crops are cultivated, the areas where cultivation of crops was started at different periods, or the like. Accordingly, the character or environmental response of crops or the like can be appropriately determined for each area.

Additionally, the clustering reflecting the user input allows the measurement result to be obtained for each of the areas desired by the user.

Note that FIG. 12 illustrates the clustering based on the user input, macro measurement values, and micro measurement values, but that, for example, the clustering calculation based only on the user input may be performed in which only step S301 in FIG. 12 is executed.

Additionally, in the example referred to in the embodiment, the clustering is performed on the basis of the detection data from the macro measurement section 2 or the detection data from the micro measurement section 3.

For example, by using the detection data from the macro measurement section 2 or the micro measurement section 3 (or information calculated from the detection data), areas with definitely different shapes or statuses can be discriminated from one another, thus allowing an automatic clustering calculation.

This allows automatization of clustering for the areas where different crops are cultivated, the areas where cultivation of crops was started at different periods, or the like. Thus, the character or environmental response of crops or the like can be accurately determined for each area without a need for much effort of the user.

FIG. 12 illustrates the clustering based on the user input, macro measurement values, and micro measurement values. However, for example, the clustering calculation based only on the macro measurement values and micro measurement values may be performed in which only step S302 in FIG. 12 is executed. Furthermore, the clustering calculation based only on the macro measurement values and the clustering calculation based only on the micro measurement values are possible.

In the example referred to in the embodiment, the clustering is based on the user input specifying the areas, and the detection data from the macro measurement section or the detection data from the micro measurement section.

That is, the clustering calculation is preformed that reflects both manual input and automatic discrimination.

In the example illustrated in FIG. 12, the clustering calculation section 28 performs the clustering using the detection data from the macro measurement section 2, the detection data from the micro measurement section 3, and the input data from the operation input section 7. In this case, in addition to the accuracy of the user input and reflection of the request, the factor of the automatic discrimination of areas with different vegetation situations is further provided, allowing the measurement result to be obtained for each of more appropriate areas.

In the example in FIG. 12, the clustering based on the user input is subdivided by the automatic discrimination. However, in contrast, the clustering based on the automatic discrimination may be subdivided by the user input.

The model parameters described in the embodiment can be any one or more of the three-dimensional structure of plants, the height of the plants, the average leaf angle (average leaf inclination), the plant coverage, the LAI, the chlorophyll concentration, the spectral characteristics of soil, or the sun leaf ratio.

The examples referred to in FIG. 15B are the LAI, the average leaf angle, and the sun leaf ratio. Other model parameters may be applied according to the purpose of the measurement.

Thus, the model parameters can be suitably applied to the measurement appropriate for the remote sensing of vegetation.

In the example referred to in the embodiment, the micro measurement section 3 includes, as the micro measurement sensor 3S, any of a visible-light image sensor, a stereo camera, a sensor for laser image detection and ranging, a polarization sensor, or a ToF sensor.

These sensors are suitable for analysis of the character, environmental response, range, distribution, and the like of the measurement target, for example, shape analysis or the like.

Additionally, the sensors are relatively easy to mount in the flying body 200 and is suitable for operation of the flying body 200 as a small unmanned flying body such as a drone.

In the example referred to in the embodiment, the macro measurement section 2 includes, as the macro measurement sensor 2S, any of a multi spectrum camera, a hyper spectrum camera, a Fourier transform infrared spectroscope, or an infrared sensor.

These sensors are suitable for analysis of various physical property values such as information regarding photosynthesis.

Additionally, the sensors are relatively difficult to mount in the flying body 200. Thus, mounting the sensors, for example, in the artificial satellite 210 allows facilitation of operation of the flying body 200 as a small unmanned flying body such as a drone.

The information processing apparatus 1 in the embodiment includes the data saving and output section 30 generating and outputting image data on the basis of the calculation result from the inverse model calculation section 27.

The calculation result from the inverse model calculation section 27 may be unsuitable as an image viewed by human beings (understanding an evaluation result from the image is difficult) without any change to the calculation result. Thus, the data saving and output section 30 converts the calculation result into an image suitable for presentation to human beings and outputs the resultant image to the display section 56, the network 5, or the storage device 6. Thus, the user can be provided with an image from which the calculation result is easily understandable.

In the example referred to in the embodiment, the data saving and output section 30 generates an output image resulting from color mapping of the calculation result from the inverse model calculation section 27 (see FIGS. 16A and 16B).

That is, in a case where the calculation result from the inverse model calculation section 27 is obtained for each area corresponding to the macro resolution unit, the image presented to the user is generated as an image in which colors are allocated to the respective areas.

Thus, the user can be provided with an image allowing analysis results to be recognized on a color-by-color basis.

In the example referred to in the embodiment, the data saving and output section 30 generates an output image resulting from synthesis of an image resulting from color mapping of the calculation result from the inverse model calculation section 27 and another image (see FIGS. 17A, 17B, 17C, 18A, 18B, and 18C).

By synthesizing, by overlaying or overwriting, another image and an image resulting from color mapping, the data saving and output section 30 can provide the user with an image allowing the evaluation result to be recognized for each area on a color-by-color basis while allowing each of the areas to be recognized by virtue of the another image.

In the example referred to in the embodiment, the macro measurement section 2 is mounted in the artificial satellite 210.

The artificial satellite 210 includes relatively high functions, and a large-scale sensor can be easily mounted in the artificial satellite 210. Thus, the artificial satellite 210 is suitable for mounting of the macro measurement section 2, which performs advanced sensing.

For example, by allowing a large number of farmers, sensing implementing organizations, or the like to share the macro measurement section 2 of the artificial satellite 210, operational costs can be reduced and the macro measurement sensor 2S can be effectively utilized.

Note that, instead of the artificial satellite 210, the flying body 200 or a relatively large flying body may be equipped with the macro measurement section 2 and perform sensing at a position higher than the position where the micro measurement section 3 performs sensing.

In the example referred to in the embodiment, the micro measurement section 3 is mounted in the flying body 200 enabled to be radio-controlled or automatically controlled.

Examples of the flying body 200 enabled to be radio-controlled or automatically controlled include what is called a drone, a small radio-controlled fixed-wing airplane, a small radio-controlled helicopter, and the like.

The small flying body 200 performs sensing at a relatively low altitude from the measurement target such as the farm field 300. In this case, the small flying body 200 is suitable for sensing at a high spatial resolution.

Additionally, avoiding mounting of the macro measurement section 2 in the flying body 200 facilitates operation of the small flying body 200 and enables a reduction in costs for sensing.

In the example referred to above, the information processing apparatus 1 according to the embodiment includes the holding section 26 holding the inverse model calculation program and inverse model input from the external apparatus.

That is, the information processing apparatus 1 allows acquisition, from the external apparatus, of a program defining a calculation algorithm for an interpolation analysis calculation section.

For example, a program for an interpolation analysis calculation is acquired from the external apparatus such as the network 5 or the storage device 6 and saved in the holding section 26. The inverse model calculation section is performed on the basis of the program. This enables the information processing apparatus 1 to perform various inverse model calculations.

A program according to the embodiment causes the information processing apparatus 1 to execute macro measurement analysis calculation processing of calculating the detection data from the macro measurement section 2 performing sensing at the macro measurement resolution for the macro measurement range RZ2 for the measurement target. The program also causes the information processing apparatus 1 to execute micro measurement analysis calculation processing of calculating the detection data from the micro measurement section 3 performing sensing at the micro measurement resolution for the micro measurement range RZ3, the micro measurement resolution being higher than before the macro measurement resolution, the micro measurement range RZ3 being included in the macro measurement range RZ2. The program further causes the information processing apparatus 1 to execute inverse model calculation processing of using the model parameters based on the detection data from the micro measurement section 3 determined by the micro measurement analysis calculation section 23, as parameters for the inverse model for the inverse model calculation using the calculation result from the macro measurement analysis calculation section 21.

That is, the program causes the information processing apparatus to execute the processing in FIG. 9, FIG. 10, and FIG. 14.

Such a program facilitates implementation of the image processing apparatus 1 according to the present embodiment.

Such a program can be prestored in, for example, a recording medium built in equipment such as a computer apparatus, a ROM in a microcomputer including a CPU, or the like. Alternatively, the program can be temporarily or persistently stored in a removable recording medium such as a semiconductor memory, a memory card, an optical disc, a magneto-optical disc, or a magnetic disk. Additionally, such a removable recording medium can be provided as what is called package software.

Additionally, in addition to being installed from a removable recording medium into a personal computer or the like, such a program can be downloaded from a download site via a network such as a LAN or the Internet.

Note that the effects described herein are merely illustrative and are not intended to be limited and that other effects may be produced.

It should be understood by those skilled in the art that various modifications, combinations, sub-combinations and alterations may occur depending on design requirements and other factors insofar as they are within the scope of the appended claims or the equivalents thereof.

Note that the present technique can also be configured as described below.

(1)

An information processing apparatus including:
a macro measurement analysis calculation section configured to calculate detection data from a macro measurement section adapted to perform sensing at a first spatial resolution for a first measurement range for a measurement target;
a micro measurement analysis calculation section configured to calculate detection data from a micro measurement section adapted to perform sensing at a second spatial resolution for a second measurement range, the second spatial resolution being higher than the first spatial resolution, the second measurement range being included in the first measurement range for the measurement target; and
an inverse model calculation section configured to acquire a model parameter used for an inverse model calculation using a calculation result from the macro measurement analysis calculation section, on the basis of the detection data from the micro measurement section determined by the micro measurement analysis calculation section.

(2)

The information processing apparatus according to (1) described above, in which
the inverse model calculation section uses the model parameter based on the detection data from the micro measurement section determined by the micro measurement analysis calculation section, as a parameter for an inverse model in the inverse model calculation using the calculation result from the macro measurement analysis calculation section.

(3)

The information processing apparatus according to (2) described above, in which
the inverse model calculation section uses the model parameter based on the detection data for the second measurement range to determine a calculation result in units of the first spatial resolution.

(4)

The information processing apparatus according to (2) or (3) described above, in which
the inverse model calculation section determines a character or an environmental response of the measurement target as a calculation result in units of the first spatial resolution.

(5)

The information processing apparatus according to any one of (1) to (4) described above, in which
the macro measurement section performs sensing at a longer distance from the measurement target than the micro measurement section.

(6)

The information processing apparatus according to any one of (1) to (5) described above, in which
the inverse model calculation section acquires a model parameter for a representative individual for each measurement area where clustering is performed, switches the model parameter for each clustered measurement area, and applies the resultant model parameter to the inverse model.

(7)

The information processing apparatus according to (6) described above, in which
the clustering is performed on the basis of user input that specifies areas.

(8)

The information processing apparatus according to (6) or (7) described above, in which
the clustering is performed on the basis of the detection data from the macro measurement section or the detection data from the micro measurement section.

(9)

The information processing apparatus according to any one of (6) to (8) described above, in which
the clustering is performed on the basis of the user input that specifies areas, and the detection data from the macro measurement section or the detection data from the micro measurement section.

(10)

The information processing apparatus according to any one of (1) to (9) described above, in which
the model parameter includes any of a three-dimensional structure of plants, a height of the plants, an average leaf angle, a plant coverage, an LAI, a chlorophyll concentration, spectral characteristics of soil, or a sun leaf ratio.

(11)

The information processing apparatus according to any one of (1) to (10) described above, in which
the micro measurement section includes, as a micro measurement sensor, any of a visible-light image sensor, a stereo camera, a sensor for laser image detection and ranging, a polarization sensor, or a ToF sensor.

(12)

The information processing apparatus according to any one of (1) to (11) described above, in which
the macro measurement section includes, as a macro measurement sensor, any of a multi spectrum camera, a hyper spectrum camera, a Fourier transform infrared spectroscope, or an infrared sensor.

(13)

The information processing apparatus according to any one of (1) to (12) described above, further including:
an output section configured to generate and output image data on the basis of a calculation result from the inverse model calculation section.

(14)

The information processing apparatus according to (13) described above, in which
the output section generates output image data resulting from color mapping of the calculation result from the inverse model calculation section.

(15)

The information processing apparatus according to (13) described above, in which
the output section generates output image data resulting from synthesis of an image resulting from color mapping of the calculation result from the inverse model calculation section and another image.

(16)

The information processing apparatus according to any one of (1) to (15) described above, in which
the macro measurement section is mounted in an artificial satellite.

(17)
The information processing apparatus according to any one of (1) to (16) described above, in which
the micro measurement section is mounted in a flying body enabled to be radio-controlled or automatically controlled.

(18)
An information processing method including:
executing, by an information processing apparatus, macro measurement analysis processing of calculating detection data from a macro measurement section configured to perform sensing at a first spatial resolution for a first measurement range for a measurement target;
executing, by the information processing apparatus, micro measurement analysis processing of calculating detection data from a micro measurement section configured to perform sensing at a second spatial resolution for a second measurement range, the second spatial resolution being higher than the first spatial resolution, the second measurement range being included in the first measurement range for the measurement target; and
executing, by the information processing apparatus, inverse model calculation processing of using a model parameter based on the detection data from the micro measurement section determined in the micro measurement analysis processing, as a parameter for an inverse model for an inverse model calculation using a calculation result in the macro measurement analysis processing.

(19)
A program causing an information processing apparatus to execute:
macro measurement analysis processing of calculating detection data from a macro measurement section configured to perform sensing at a first spatial resolution for a first measurement range for a measurement target;
micro measurement analysis processing of calculating detection data from a micro measurement section configured to perform sensing at a second spatial resolution for a second measurement range, the second spatial resolution being higher than the first spatial resolution, the second measurement range being included in the first measurement range for the measurement target; and
inverse model calculation processing of using a model parameter based on the detection data from the micro measurement section determined in the micro measurement analysis processing, as a parameter for an inverse model for an inverse model calculation using a calculation result in the macro measurement analysis processing.

(20)
A sensing system including:
a macro measurement section configured to perform sensing at a first spatial resolution for a first measurement range for a measurement target;
a micro measurement section configured to perform sensing at a second spatial resolution for a second measurement range, the second spatial resolution being higher than the first spatial resolution, the second measurement range being included in the first measurement range for the measurement target;
a macro measurement analysis calculation section configured to calculate detection data from the macro measurement section;
a micro measurement analysis calculation section configured to calculate detection data from the micro measurement section; and
an inverse model calculation section configured to use a model parameter based on the detection data from the micro measurement section determined by the micro measurement analysis calculation section, as a parameter for an inverse model for an inverse model calculation using a calculation result from the macro measurement analysis calculation section.

REFERENCE SIGNS LIST

1 Information processing apparatus, 2 Macro measurement section, 2S Macro measurement sensor, 3 Micro measurement section, 3S Micro measurement sensor, 4 Measurement target, 5 Network, 6 Storage device, 7 Operation input section, 10 Data input section, 11 Sensor input section, 12 Sensor input section, 13 Program and model input section, 20 Analysis execution section, 21 Macro measurement analysis calculation section, 22 Macro measurement analysis value buffer, 23 Micro measurement analysis calculation section, 24 Micro measurement analysis value buffer, 25 Position mapping section, 26 Inverse calculation program and model holding section, 27 Inverse model calculation section, 28 Clustering calculation section, 30 Data saving and output section, 31 Analysis data buffer, 32 Color mapping section, 33 Image synthesis section, 34 Graph generation section, 35 Image output section, 36 Data output section, 51 CPU, 52 ROM, 53 RAM, 54 Bus, 55 Input/output interface, 56 Display section, 57 Input section, 58 Speaker, 59 Storage section, 60 Communication section, 61 Drive, 200 Flying body, 210 Artificial satellite, 220 Imaging apparatus, 250 Imaging apparatus, 300 Farm field

The invention claimed is:
1. An information processing apparatus, comprising:
a central processing unit (CPU) configured to:
calculate first detection data from a macro measurement sensor configured to perform sensing at a first spatial resolution for a first measurement range for a measurement target, wherein
the macro measurement sensor includes at least one of a visible-light image sensor, a stereo camera, a sensor for laser image detection and ranging, a polarization sensor, or a time of flight (ToF) sensor;
calculate second detection data from a micro measurement sensor configured to perform sensing at a second spatial resolution for a second measurement range, wherein
the second spatial resolution is higher than the first spatial resolution,
the second measurement range is included in the first measurement range for the measurement target, and
the micro measurement sensor includes at least one of a multi spectrum camera, a hyper spectrum camera, a Fourier transform infrared spectroscope, or an infrared sensor;
acquire a first model parameter associated with an inverse model calculation, wherein
the acquisition of the first model parameter is based on the second detection data that is calculated from the micro measurement sensor, and the first model parameter includes at least one of a three-dimensional structure of plants, a height of the plants, an average leaf angle, a plant coverage, an LAI, a chlorophyll concentration, spectral characteristics of soil, or a sun leaf ratio;

configure an inverse model based on the first model parameter as a parameter for the inverse model;

apply the configured inverse model on the first detection data that is calculated from the macro measurement sensor; and determine a calculation result of the inverse model calculation based on the application of the configured inverse model on the first detection data.

2. The information processing apparatus according to claim 1, wherein
the calculation result of the inverse model calculation is determined in units of the first spatial resolution, based on the second detection data for the second measurement range.

3. The information processing apparatus according to claim 1, wherein
the calculation result of the inverse model calculation is determined as a character or an environmental response of the measurement target in units of the first spatial resolution.

4. The information processing apparatus according to claim 1, wherein
the macro measurement sensor is configured to perform sensing at a first distance from the measurement target,
the micro measurement sensor is configured to perform sensing at a second distance from the measurement target, and
the first distance is longer than the second distance.

5. The information processing apparatus according to claim 1, wherein the CPU is further configured to:
perform clustering a set of measurement areas associated with the measurement target;
acquire a second model parameter for a representative individual for each measurement area of the set of measurement areas where the clustering is performed;
switch the second model parameter for each clustered measurement area of the set of measurement areas; and
apply the switched second model parameter to the inverse model.

6. The information processing apparatus according to claim 5, wherein
the clustering is performed based on user input that specifies measurement areas corresponding to the set of measurement areas.

7. The information processing apparatus according to claim 5, wherein
the clustering is performed based on at least one of the first detection data from the macro measurement sensor or the second detection data from the micro measurement sensor.

8. The information processing apparatus according to claim 5, wherein
the clustering is performed based on user input that specifies measurement areas corresponding to the set of measurement areas, and further based on at least one of the first detection data from the macro measurement sensor or the second detection data from the micro measurement sensor.

9. The information processing apparatus according to claim 1, wherein the CPU is further configured to:
generate and render output image data based on the determined calculation result of the inverse model calculation.

10. The information processing apparatus according to claim 9, wherein
the generation of the output image data is based on a color mapping of the determined calculation result of the inverse model calculation.

11. The information processing apparatus according to claim 9, wherein
the generation of the output image data is based on a synthesis of a first image and a second image, and
the first image is generated based on a color mapping of the determined calculation result of the inverse model calculation.

12. The information processing apparatus according to claim 1, wherein
the macro measurement sensor is mounted in an artificial satellite.

13. The information processing apparatus according to claim 1, wherein
the micro measurement sensor is mounted in a flying body enabled to be radio-controlled or automatically controlled.

14. An information processing method, comprising:
calculating, by an information processing apparatus, first detection data from a macro measurement sensor configured to perform sensing at a first spatial resolution for a first measurement range for a measurement target, wherein
the macro measurement sensor includes at least one of a visible-light image sensor, a stereo camera, a sensor for laser image detection and ranging, a polarization sensor, or a time of flight (ToF) sensor;
calculating, by the information processing apparatus, second detection data from a micro measurement sensor configured to perform sensing at a second spatial resolution for a second measurement range, wherein
the second spatial resolution is higher than the first spatial resolution,
the second measurement range is included in the first measurement range for the measurement target, and
the micro measurement sensor includes at least one of a multi spectrum camera, a hyper spectrum camera, a Fourier transform infrared spectroscope, or an infrared sensor;
acquiring, by the information processing apparatus, a first model parameter associated with an inverse model calculation, wherein
the acquisition of the first model parameter is based on the second detection data that is calculated from the micro measurement sensor, and
the first model parameter includes at least one of a three-dimensional structure of plants, a height of the plants, an average leaf angle, a plant coverage, an LAI, a chlorophyll concentration, spectral characteristics of soil, or a sun leaf ratio;
configuring, by the information processing apparatus, an inverse model based on the first model parameter as a parameter for the inverse model;
applying, by the information processing apparatus, the configured inverse model on the first detection data that is calculated from the macro measurement sensor; and
determining, by the information processing apparatus, a calculation result of the inverse model calculation based on the application of the configured inverse model on the first detection data.

15. A non-transitory computer-readable medium having stored thereon, computer-executable instructions that when executed by an information processing apparatus, causes the information processing apparatus to execute operations, the operations comprising:
calculating first detection data from a macro measurement sensor configured to perform sensing at a first spatial resolution for a first measurement range for a measurement target, wherein
the macro measurement sensor includes at least one of a visible-light image sensor, a stereo camera, a sensor for laser image detection and ranging, a polarization sensor, or a time of flight (ToF) sensor;
calculating second detection data from a micro measurement sensor configured to perform sensing at a second spatial resolution for a second measurement range, wherein
the second spatial resolution is higher than the first spatial resolution,
the second measurement range is included in the first measurement range for the measurement target, and
the micro measurement sensor includes at least one of a multi spectrum camera, a hyper spectrum camera, a Fourier transform infrared spectroscope, or an infrared sensor;
acquiring a first model parameter associated with an inverse model calculation, wherein
the acquisition of the first model parameter is based on the second detection data that is calculated from the micro measurement sensor, and
the first model parameter includes at least one of a three-dimensional structure of plants, a height of the plants, an average leaf angle, a plant coverage, an LAI, a chlorophyll concentration, spectral characteristics of soil, or a sun leaf ratio;
configuring an inverse model based on the first model parameter as a parameter for the inverse model;
applying the configured inverse model on the first detection data that is calculated from the macro measurement sensor; and
determining a calculation result of the inverse model calculation based on the application of the configured inverse model on the first detection data.

16. A sensing system, comprising:
a macro measurement sensor configured to:
perform sensing at a first spatial resolution for a first measurement range for a measurement target, wherein
the macro measurement sensor includes at least one of a visible-light image sensor, a stereo camera, a sensor for laser image detection and ranging, a polarization sensor, or a time of flight (ToF) sensor;
a micro measurement sensor configured to:
perform sensing at a second spatial resolution for a second measurement range, wherein
the second spatial resolution is higher than the first spatial resolution,
the second measurement range is included in the first measurement range for the measurement target, and
the micro measurement sensor includes at least one of a multi spectrum camera, a hyper spectrum camera, a Fourier transform infrared spectroscope, or an infrared sensor; and
a central processing unit (CPU) configured to:
calculate first detection data from the macro measurement sensor,
calculate second detection data from the micro measurement sensor,
acquire a first model parameter associated with an inverse model calculation, wherein
the acquisition of the first model parameter is based on the second detection data that is calculated from the micro measurement sensor, and
the first model parameter includes at least one of a three-dimensional structure of plants, a height of the plants, an average leaf angle, a plant coverage, an LAI, a chlorophyll concentration, spectral characteristics of soil, or a sun leaf ratio,
configure an inverse model based on the first model parameter as a parameter for the inverse model,
apply the configured inverse model on the first detection data that is calculated from the macro measurement sensor, and
determine a calculation result of the inverse model calculation based on the application of the configured inverse model on the first detection data.

* * * * *